United States Patent
Bussing et al.

(10) Patent No.: US 11,673,277 B1
(45) Date of Patent: Jun. 13, 2023

(54) FOUR-BAR CLAMPING DEVICE

(71) Applicants: Jonathan Edward Bussing, Redwood City, CA (US); Edward Anthony Bussing, Redwood City, CA (US)

(72) Inventors: Jonathan Edward Bussing, Redwood City, CA (US); Edward Anthony Bussing, Redwood City, CA (US)

( * ) Notice: Subject to any disclaimer, the term of this patent is extended or adjusted under 35 U.S.C. 154(b) by 0 days.

(21) Appl. No.: 17/568,681

(22) Filed: Jan. 4, 2022

Related U.S. Application Data

(60) Provisional application No. 63/133,785, filed on Jan. 4, 2021.

(51) Int. Cl.
*B25B 5/00* (2006.01)
*B25J 15/10* (2006.01)
*B25J 9/10* (2006.01)
*B25B 5/04* (2006.01)

(52) U.S. Cl.
CPC ............... *B25J 15/10* (2013.01); *B25B 5/04* (2013.01); *B25J 9/10* (2013.01)

(58) Field of Classification Search
CPC .... B25B 5/00; B25B 3/00; B25B 5/02; B25B 5/04; B25B 5/06; B25B 27/00; B25J 15/10
See application file for complete search history.

(56) References Cited

U.S. PATENT DOCUMENTS

| | | | | |
|---|---|---|---|---|
| 1,682,956 A * | 9/1928 | Dawson | ................ | B25B 27/023 29/261 |
| 1,831,477 A * | 11/1931 | Birong | .................... | H01K 3/32 81/53.11 |
| 5,887,328 A * | 3/1999 | Rydin | .................... | B25B 27/02 29/259 |
| 9,679,760 B2 * | 6/2017 | Johnson | .................. | F21V 21/36 |
| 11,084,152 B2 * | 8/2021 | Martinez | ............... | B25B 27/026 |

* cited by examiner

*Primary Examiner* — Lee D Wilson

(57) ABSTRACT

A clamping device comprises an inner rod, a sliding handle, one or more claws, a top yoke, a bottom yoke, a spring, and a counterweight. The sliding handle surrounds and slides about the inner rod. The top yoke is coupled to the inner rod and each claw is coupled to the top yoke. The bottom yoke is coupled to the sliding handle and each claw is coupled to the bottom yoke via linkage bars. The inner rod is coupled to the counterweight. The spring extends between the sliding handle and the counterweight. The claws, top yoke, linkage bars, and bottom yoke form four-bar linkages. The clamping device clamps an object via a spring force transferred to the claws via the four-bar linkages. Each claw provides an equivalent clamping force independent of orientation of the apparatus. Spring tension is configurable by threading the inner rod into and out of the counterweight.

19 Claims, 28 Drawing Sheets

PERSPECTIVE VIEW OF CLOSED CLAMP

PERSPECTIVE VIEW OF OPEN CLAMP

PERSPECTIVE VIEW OF CLOSED CLAMP

PERSPECTIVE VIEW OF OPEN CLAMP

EXPANDED VIEW OF CLAW

SIDE VIEW OF CLAMP IN CLOSED STATE

SIDE VIEW OF CLAMP IN OPEN STATE

TOP-DOWN VIEW OF CLOSED CLAMP

TOP-DOWN VIEW OF OPEN CLAMP

BOTTOM-UP VIEW OF CLOSED CLAMP

BOTTOM-UP VIEW OF OPEN CLAMP

CROSS SECTIONAL VIEW OF CLAMP IN CLOSED STATE
(CROSS SECTION A-A)

CROSS SECTIONAL VIEW OF CLAMP IN OPEN STATE
(CROSS SECTION A-A)

SIDE VIEW OF CLAMP IN LOCKED STATE
(SPRING FULLY COMPRESSED)

CROSS SECTIONAL VIEW OF CLAMP IN LOCKED STATE
(CROSS SECTION A-A)

USING CLAMP TO HOLD AN OBJECT

PERSPECTIVE VIEW OF CLOSED CLAMP

RIGHT SIDE VIEW OF OPEN CLAMP

SIDE VIEW OF CLAMP IN CLOSED STATE

SIDE VIEW OF CLAMP IN OPEN STATE

TOP-DOWN VIEW OF CLOSED CLAMP

TOP-DOWN VIEW OF OPEN CLAMP

BOTTOM-UP VIEW OF CLOSED CLAMP

BOTTOM-UP VIEW OF OPEN CLAMP

CROSS SECTIONAL VIEW OF CLAMP IN CLOSED STATE (CROSS SECTION B-B)

CROSS SECTIONAL VIEW OF CLAMP IN OPEN STATE
(CROSS SECTION B-B)

SIDE VIEW CLAW CLAMP IN LOCKED STATE
(SPRING FULLY COMPRESSED)

CROSS SECTIONAL VIEW OF CLAMP IN LOCKED STATE
(CROSS SECTION B-B)

USING CLAMP TO HOLD AN OBJECT

MANUFACTURING CLAMP

ASSEMBLING CLAMP

PROVIDING CLAMP

USING CLAMP

PACKAGED FOUR-BAR CLAMPING DEVICE WITH INTERCHANGEABLE CLAWS

INTERCHANGEABLE/REPLACEABLE CLAWS

EXAMPLE OF CLAMP DEVICE

CONVENTIONAL HOLDER

FOUR-BAR CLAMPING DEVICE

CROSS REFERENCE TO RELATED APPLICATIONS

This application claims the benefit under 35 U.S.C. § 119 from U.S. Provisional Patent Application Ser. No. 63/133,785, entitled "Three Claw Grabbing Tool For Hot Glass," filed on Jan. 4, 2021, the subject matter of which is incorporated herein by reference.

TECHNICAL FIELD

The present invention relates generally to mechanical systems, and more specifically, to clamping devices.

BACKGROUND INFORMATION

A clamp is a commonly used fastening device to hold or secure an object. Clamps are often used when working on an object to hold the object in place and avoid undesirable movement of the object. One common application is in glasswork. In lampworking, a torch is used to melt an amount of glass. After the glass is in a molten state, the glass is manipulated into a desired form by blowing and shaping with tools and hand movements. Clamps are particularly useful in such glasswork due to the high temperatures of the glass.

SUMMARY

A clamping device comprises an inner rod, a sliding handle, one or more claws, a top yoke, a bottom yoke, a spring, and a counterweight. The sliding handle surrounds and slides about the inner rod. The top yoke is coupled to the inner rod and each claw is coupled to the top yoke. The bottom yoke is coupled to the sliding handle and each claw is coupled to the bottom yoke via linkage bars. The inner rod is coupled to the counterweight. The spring extends between the sliding handle and the counterweight. The claws, top yoke, linkage bars, and bottom yoke form four-bar linkages. The clamping device clamps an object via a spring force transferred to the claws via the four-bar linkages. In one embodiment, a clamping device includes one claw. In another embodiment, a clamping device includes two claws. In yet another embodiment, a clamping device includes three claws. In still another embodiment, a clamping device includes four or more claws.

The four-bar linkages provided by the novel clamp yield a symmetrical clamping force. The clamping force is the same across all claws of the clamping device independent of orientation of the clamping device and independent of the position of the clamping device when opened or closed. This is a significant advantage over known clamps which depend on gravity to supply a symmetrical clamping force. For example, conventional clamps require a user to open the clamp while fully upright and clamp an object while maintaining the clamp in a fully upright orientation, otherwise, an object will not be clamped symmetrical within the claws.

The novel clamp includes a counterweight that is adjustable. By rotating the counterweight, the inner rod screws in and out of the counterweight thereby configuring the spring tension. In addition, the novel clamp can be transitioned to a locked state such that the sliding handle is adjacent to the counterweight preventing movement of the sliding handle.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
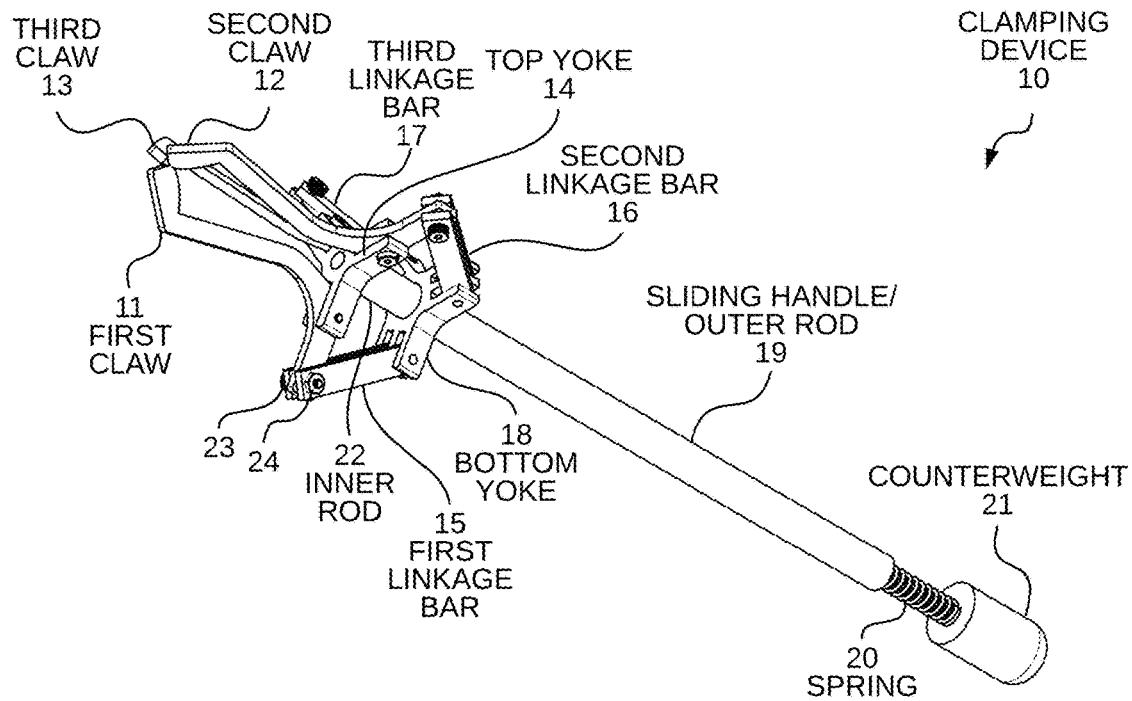
FIG. 1 is a diagram showing a perspective view of a clamp device 10 in a closed configuration.

FIG. 1 is a diagram showing a perspective view of a clamp device 10 in a closed configuration. The clamp device 10 comprises a first claw 11, a second claw 12, a third claw 13, a top yoke 14, first linkage bar 15, second linkage bar 16, third linkage bar 17, a bottom yoke 18, a sliding handle 19, a spring 20, a counterweight 21, an inner rod 22, and a plurality of fasteners 23 and 24. The clamp device 10 is a multi-claw or single claw device. In this example, the clamp device 10 includes three claws 11, 12, 13 used to clamp an object.

The sliding handle 19 surrounds and slides about the inner rod 22. The inner rod is coupled to the counterweight 21. The spring 20 surrounds a portion of the inner rod 22. The spring 20 pushes against the counterweight 21 and applies force to the sliding handle 19. The sliding handle 19 is also referred to as an "outer rod" and the inner rod 22 is also referred to as a "central rod". The top yoke 14 is coupled to the inner rod 22. Each of the claws 11, 12, and 13 is coupled to the top yoke 14. The bottom yoke 18 is coupled to the sliding handle 19. Each of the counterweight 21, the top yoke 14, and the bottom yoke 18 is also referred to as a "support".

The spring 20 is selected based on a desired clamping force and range. In one embodiment, spring 20 has length of 3" in a relaxed state, a length of 1.32" in a fully compressed state, and has a max load of 25.5 LB. In another embodiment, spring 20 has length of 2.5" in a relaxed state, a length of 0.85" in a fully compressed state, and has a max load of 13.5 LB. In yet another embodiment, spring 20 has length of 2.78" in a relaxed state, a length of 1.72" in a fully compressed state, and has a max load of 12 LB.

Each of the claws 11, 12, and 13 is coupled to the bottom yoke 18 via one or more linkage bars. In this embodiment, each of the claws 11, 12, and 13 is coupled to the bottom yoke 18 via two linkage bars. The first claw 11 is coupled to the bottom yoke 18 via first linkage bars 15. The second claw 12 is coupled to the bottom yoke 18 via second linkage bars 16. The third claw 13 is coupled to the bottom yoke 18 via third linkage bars 18. In other embodiments, only one linkage bar is used to couple each claw to the bottom yoke 18. In still other embodiments, more than two linkage bars are used to couple each claw to the bottom yoke 18. Each of the claws 11, 12, and 13 is also referred to as "grabbing members", "grabbing elements", "fingers".

The top yoke 14, the claws 11, 12, and 13, the linkage bars 15, 16, and 17, and the bottom yoke 18 form four-bar mechanical linkages. These four-bar linkages or "four-bars" provide a symmetrical clamping force across all claws of the novel clamping device 10 independent of orientation of the clamping device 10 and independent of the position of the clamping device 10 when being opened or closed. This is a significant advantage over known clamps which depend on gravity to supply a symmetrical clamping force. For example, conventional clamps require a user to open the clamp while fully upright and clamp an object while maintaining the clamp in a fully upright orientation, otherwise, an object will not be clamped symmetrical within the claws.

Figure 2:
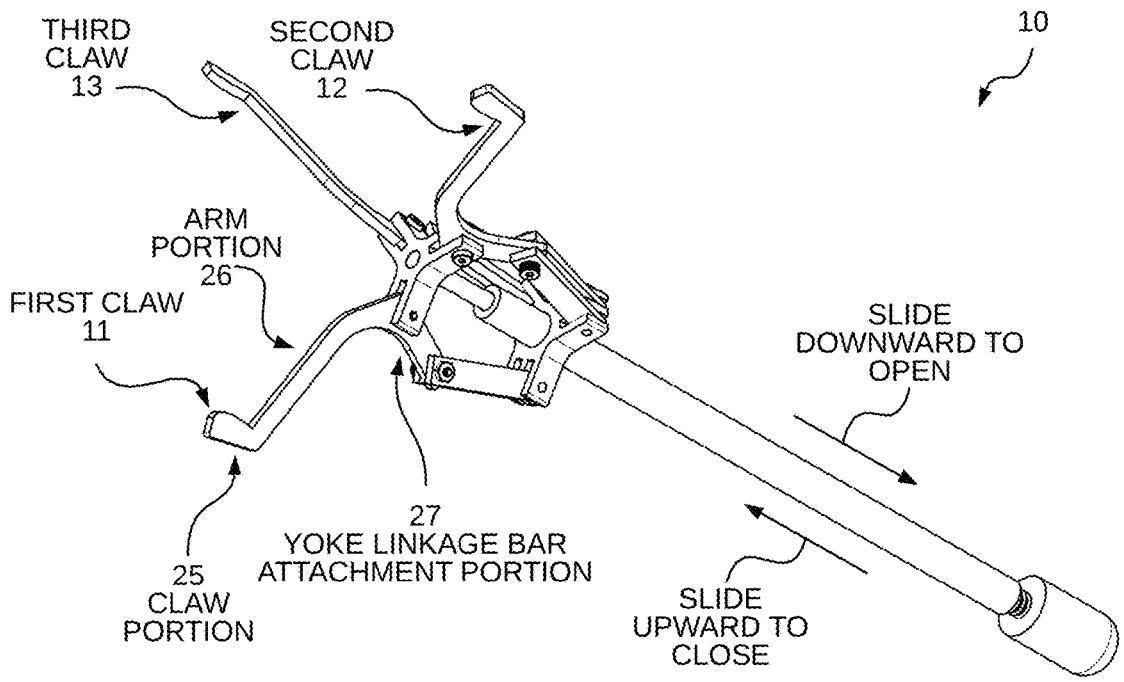
FIG. 2 is a diagram showing a perspective view of the clamp device 10 in an open configuration.

FIG. 2 is a diagram showing a perspective view of the clamp device 10 in an open configuration. The clamp device 10 transitions between the open and closed configurations via the sliding handle 19. To transition to the open configuration, the sliding handle 19 is slid downward towards the counterweight 21. To transition to the closed configuration, the sliding handle 19 is slid upwards away from the counterweight 21. In the open configuration, an object is inserted between the claws 11, 12, and 13. Once the object is in a desired orientation, the sliding handle is slid upwards away from the counterweight 21 causing the claws 11, 12, and 13 to clamp the object.

Figure 3:
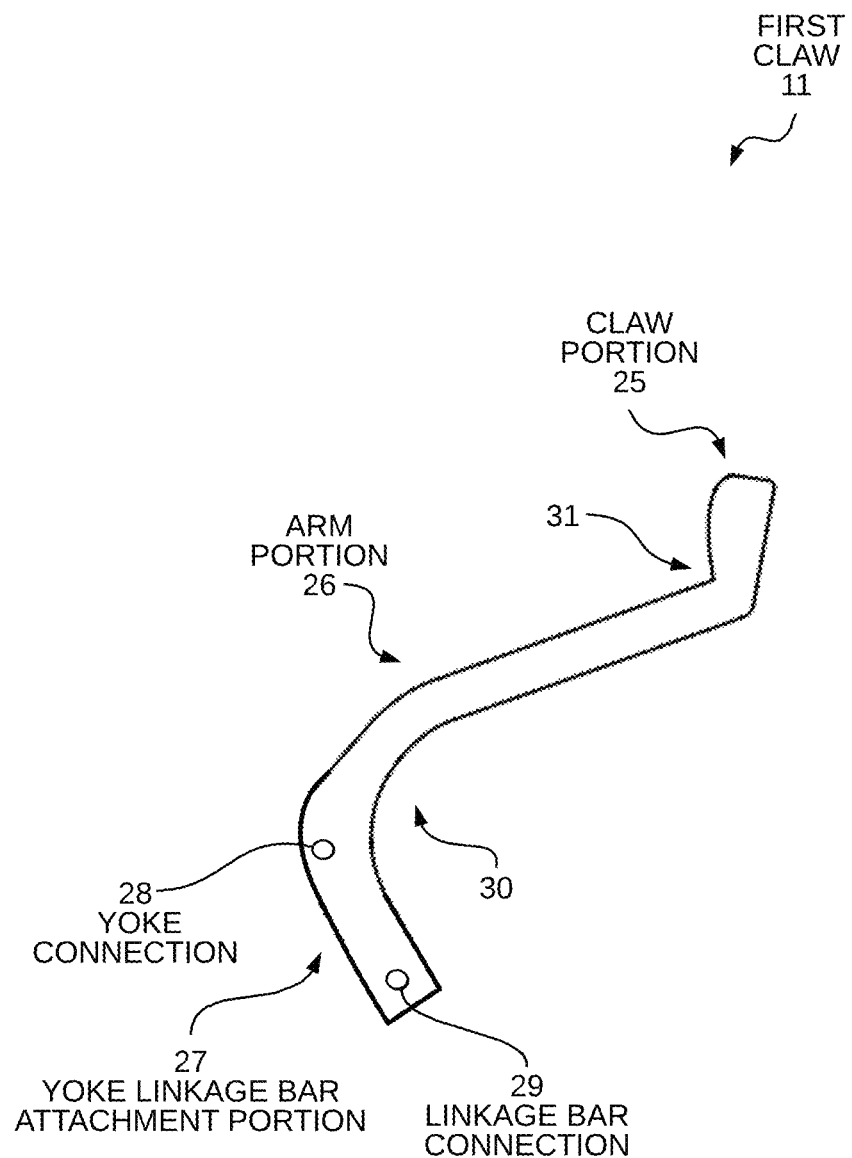
FIG. 3 is a diagram showing an expanded view of the first claw 11.
Figure 33:
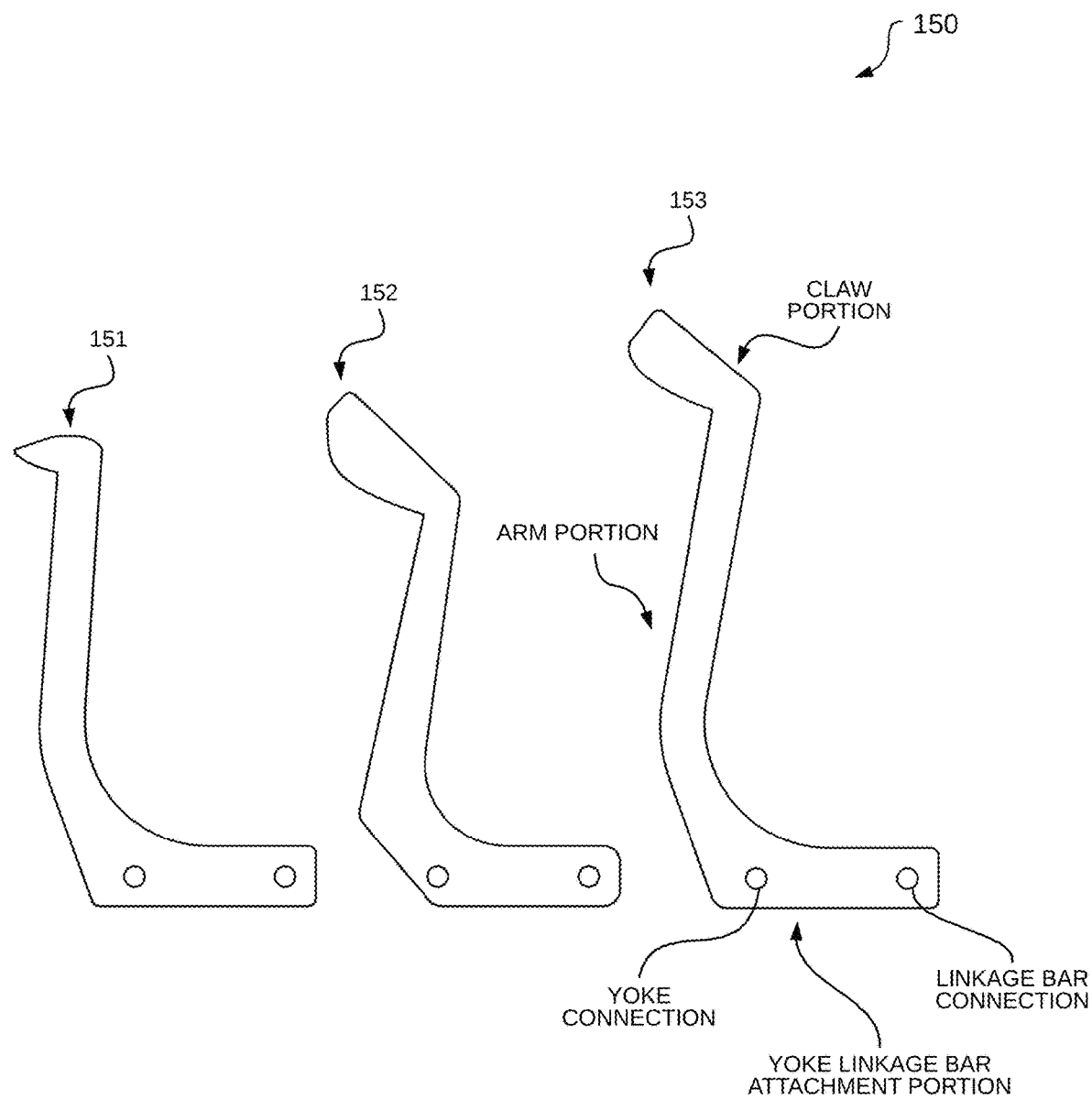
FIG. 33 is a diagram showing a plurality of claws 150 having various shapes, sizes, and designs.

FIG. 3 is a diagram showing an expanded view of the first claw 11. The first claw 11 includes a claw portion 25, an arm portion 26, a yoke linkage bar attachment portion 27, a yoke connection 28, and a linkage bar connection 29. The yoke connection 28 is an opening or other mechanical linkage that connects to the top yoke 14. The linkage bar connection 29 is an opening or other mechanical linkage that connects to one or more linkage bars, such as linkage bar 15. The yoke linkage bar attachment portion 27 extends a distance between the yoke connection 28 and the linkage bar connection 29. Reference numeral 30 identifies a curvature formed between the yoke linkage bar attachment portion 27 and the arm portion 26. Reference numeral 31 identifies an angle formed between the arm portion 25 and the claw portion 26. Each claw may have different shape, thickness, length, orientation, design, or material characteristics depending on desired clamping characteristics. In other embodiments, each claw has varying material components. For example, in one embodiment, the claw portion 25 is formed from a more heat resistant material than the arm portion 26. FIG. 33 shows a variety of different types of claws. Different claw designs provide different gripping characteristics and different diameter gripping range.

Figure 4:
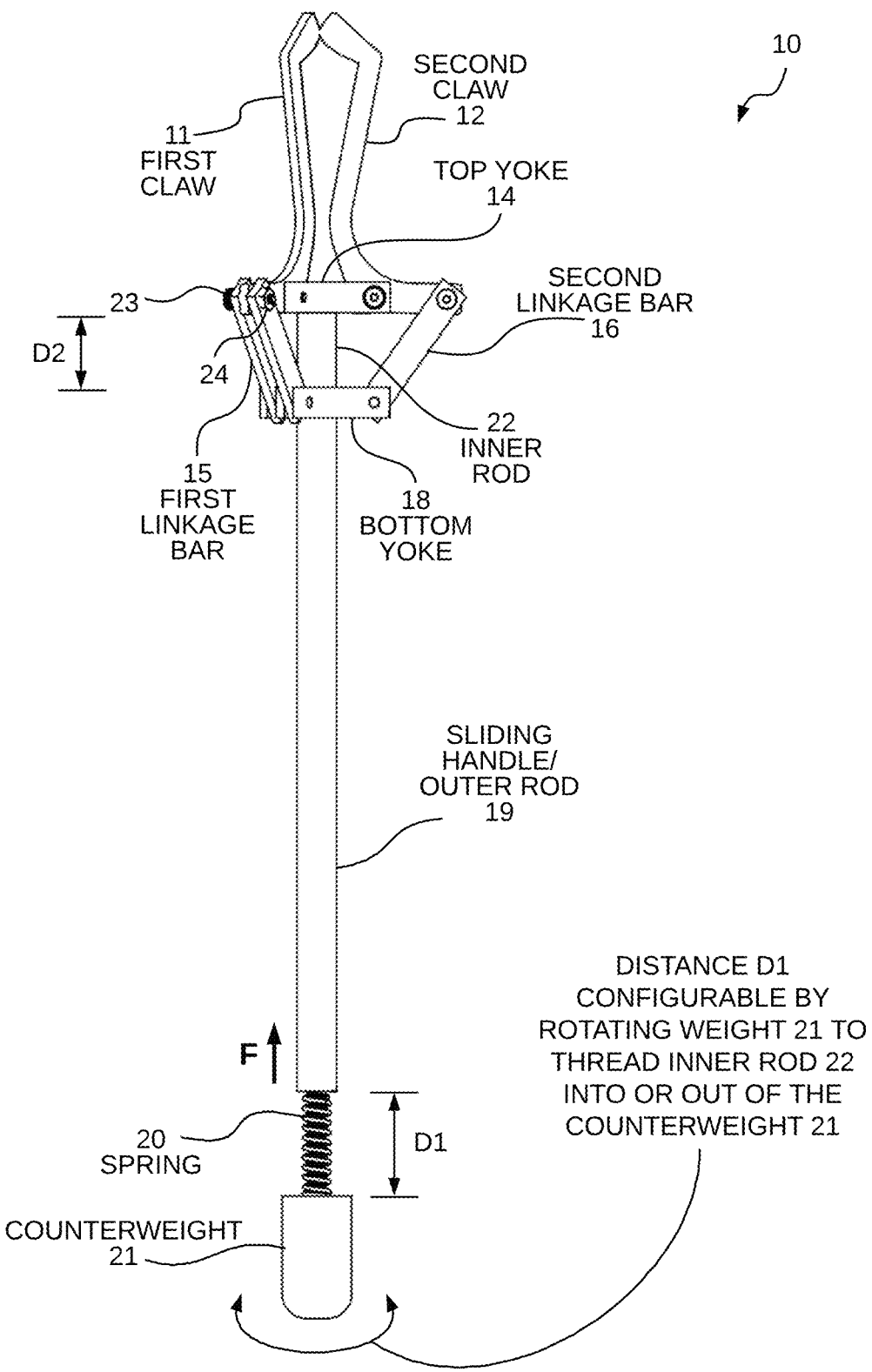
FIG. 4 is a diagram showing a side view of the clamp device 10 in the closed configuration.

FIG. 4 is a diagram showing a side view of the clamp device 10 in the closed configuration. In the closed configuration, spring 20 applies a spring force F to the sliding handle 19 (see detail in FIG. 10.) This spring force F maintains a distance D1 between the sliding handle 19 and the counterweight 21 and maintains the clamp device 10 in the closed configuration.

In accordance with at least one novel aspect, the counterweight 21 is rotated counterclockwise or clockwise to increase the distance D1 (reducing spring tension) or decrease the distance D1 (increasing spring tension). When the counterweight 21 is rotated clockwise, the inner rod 22 is threaded down into an interior of the counterweight 21. When the counterweight 21 is rotated counterclockwise, the inner rod 22 is threaded up through the interior of the counterweight 21. Adjusting the distance D1 changes the opening range of claws 11, 12, and 13.

Figure 5:
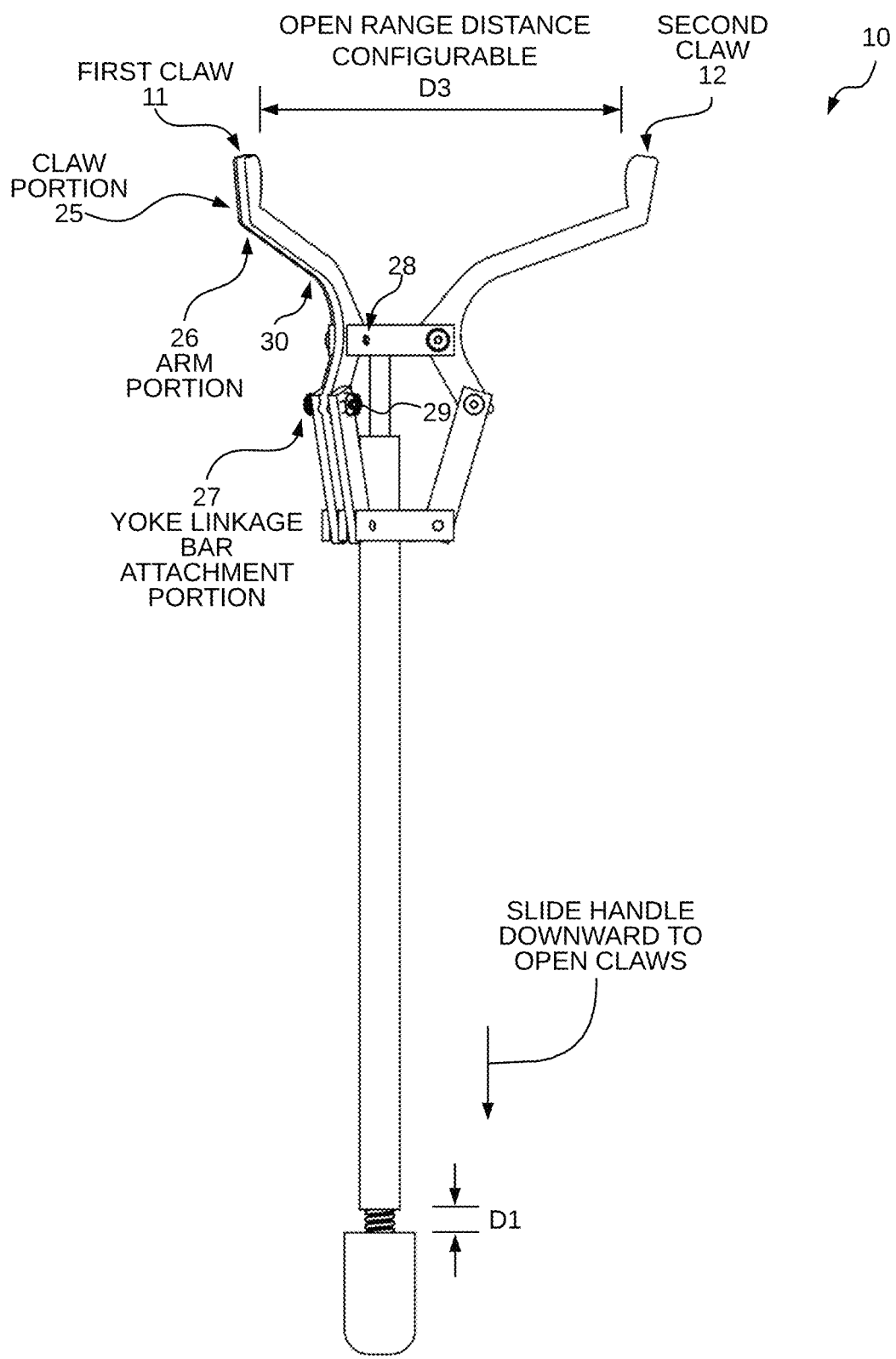
FIG. 5 is a diagram showing a side view of the clamp device 10 in the open configuration.

FIG. 5 is a diagram showing a side view of the clamp device 10 in the open configuration. To transition to the open configuration, the sliding handle 19 is slid downward towards the counterweight 21. The distance D1 between the sliding handle 19 and the counterweight 21 decreases. This in turn causes the linkage bars 15, 16, and 17 to rotate downward thereby causing the claws 11, 12, and 13 to rotate open.

Figure 6:
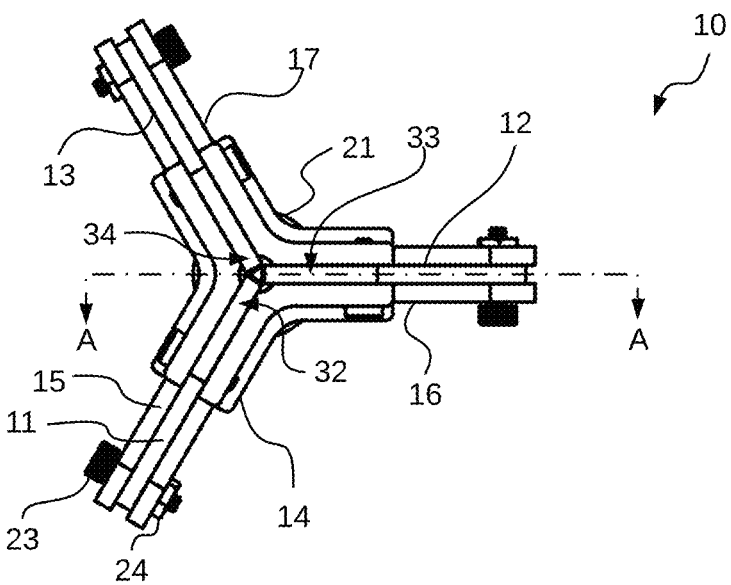
FIG. 6 is a diagram showing a top-down view of the clamp device 10 in the closed configuration.

FIG. 6 is a diagram showing a top-down view of the clamp device 10 in the closed configuration. The top yoke 14 includes a plurality of slots that retain each of the claws 11, 12, and 13 and allow the claws 11, 12, and 13 to rotate open and closed. The first claw 11 is rotatably coupled to the top yoke 14 via the first slot 32. The second claw 12 is rotatably coupled to the top yoke 14 via the second slot 33. The third claw 13 is rotatably coupled to the top yoke 14 via the third slot 34.

Figure 7:
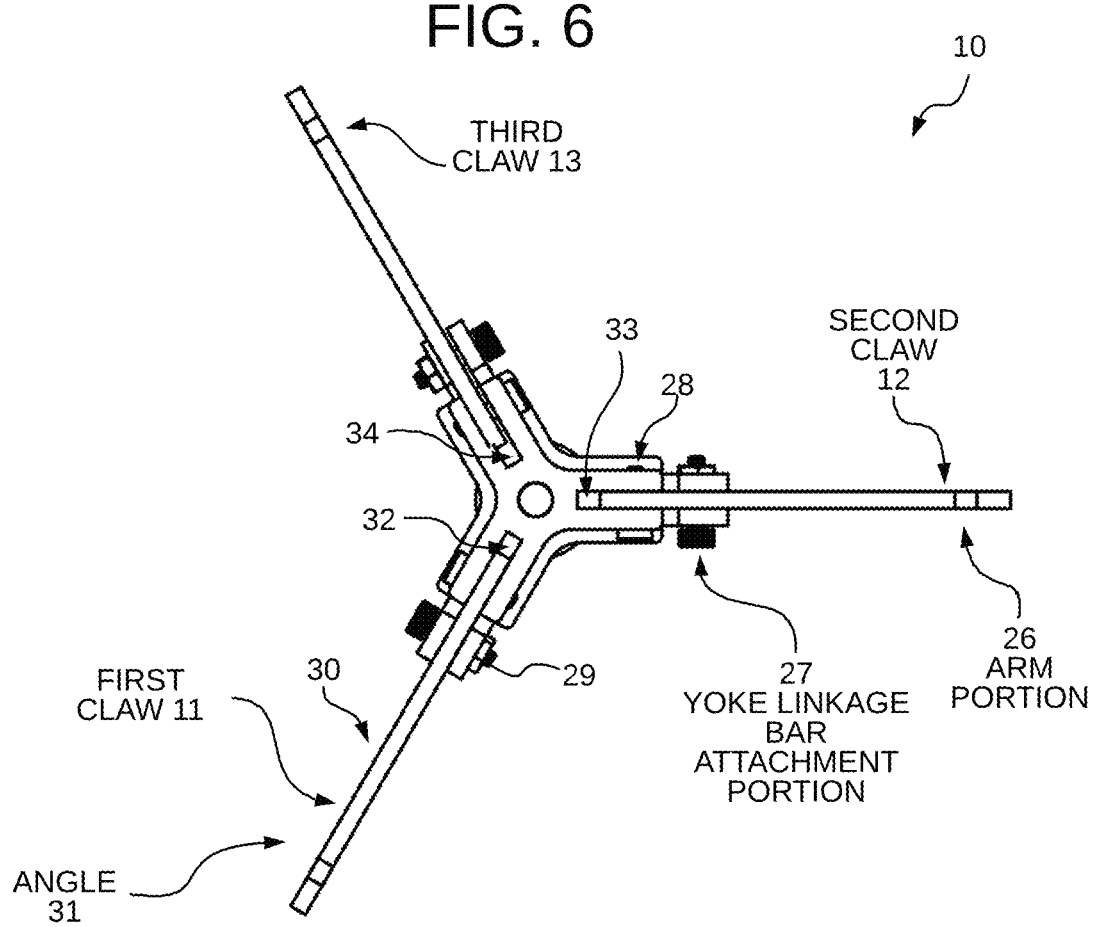
FIG. 7 is a diagram showing a top-down view of the clamp device 10 in the open configuration.

FIG. 7 is a diagram showing a top-down view of the clamp device 10 in the open configuration.

Figure 8:
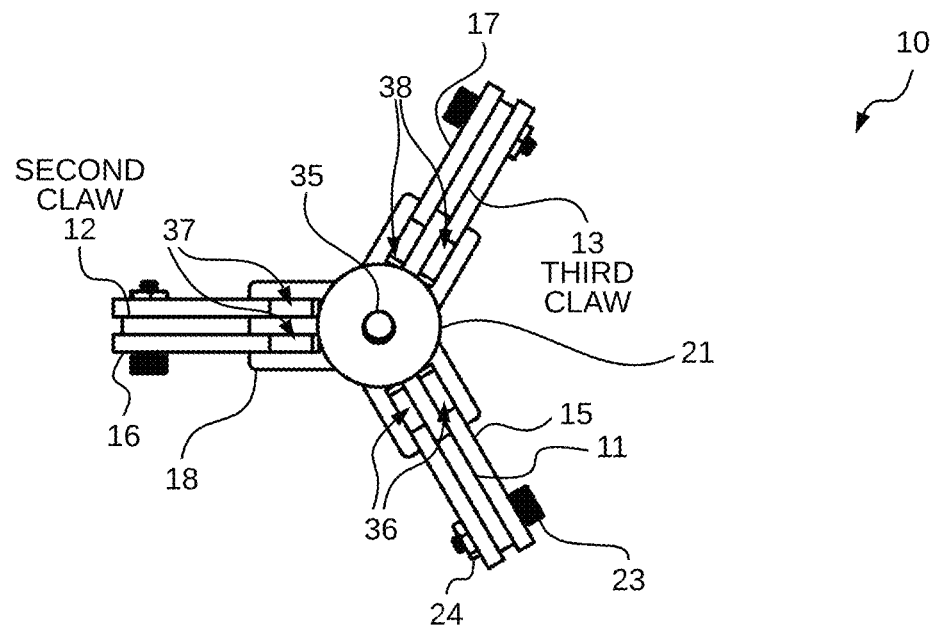
FIG. 8 is a diagram showing a bottom-up view of the clamp device 10 in the closed configuration.

FIG. 8 is a diagram showing a bottom-up view of the clamp device 10 in the closed configuration. The bottom yoke 18 includes a plurality of slots that retain each of the linkage bars 15, 16, and 17 and allow the linkage bars 15, 16, and 17 to rotate open and closed. The first linkage bars 15 are rotatably coupled to the bottom yoke 18 via first slots 36. The second linkage bars 16 are rotatably coupled to the bottom yoke 18 via second slots 37. The third linkage bars 17 are rotatably coupled to the bottom yoke 18 via third slots 38. In embodiments where each claw is coupled via only one linkage bar, only one slot may be provided for rotatable attachment to the bottom yoke 18.

Figure 9:
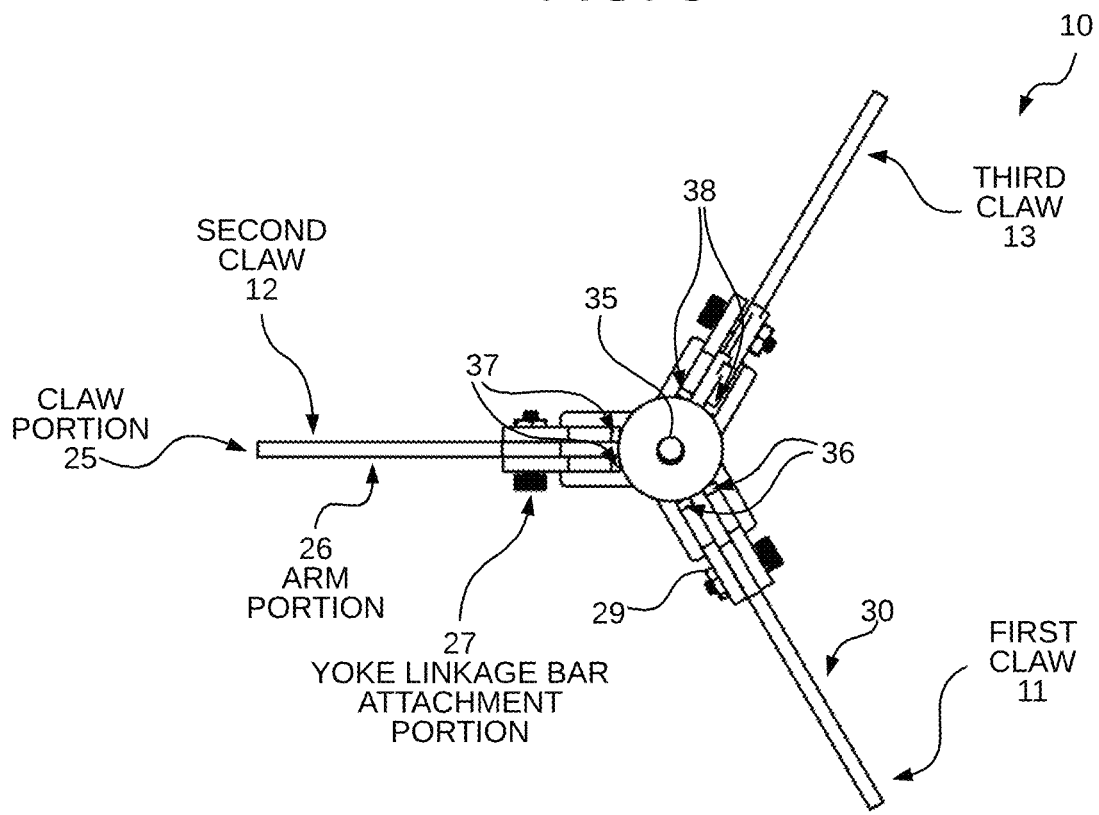
FIG. 9 is a diagram showing a bottom-up view of the clamp device 10 in the open configuration.

FIG. 9 is a diagram showing a bottom-up view of the clamp device 10 in the open configuration. Reference numeral 35 identifies an opening within the counterweight 21. The inner rod 22 screws in and out of this opening 35 via a threaded engagement.

Figure 10:
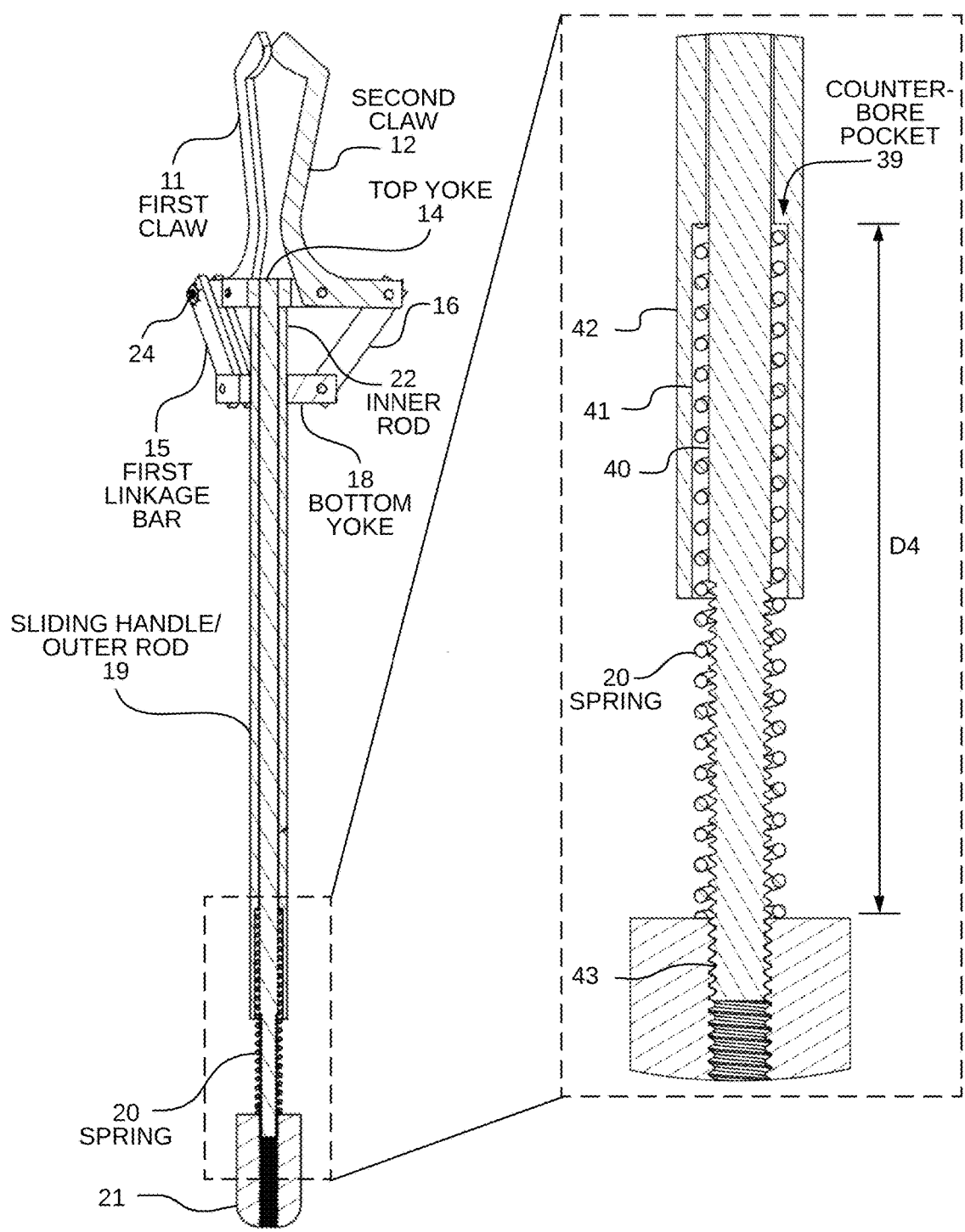
FIG. 10 is a diagram showing a cross sectional view of the clamp device 10 in the closed configuration.

FIG. 10 is a diagram showing a cross sectional view of the clamp device 10 in the closed configuration. An expanded view is included that shows how the spring 20 engages with the sliding handle 19 and the counterweight 21. The spring 20 surrounds an outer surface 40 of the inner rod 22. Part of the spring 20 is disposed between an interior surface 41 of the sliding handle 19 and the outer surface 40 of the inner rod 22. A first end or lower end of the spring 20 contacts the counterweight 21. A second end or upper end of the spring 20 contacts the sliding handle 19 and the spring 20 applies force F to the sliding handle 19. In this embodiment, the force F is generated by spring 20 tension between a top surface of the counterweight 21 and the counterbore pocket 39 contact surface.

A user slides the sliding handle 19 by grasping the outer surface 42 of the sliding handle. In this embodiment, the spring 20 contacts the sliding handle 19 via a counter bore pocket 39. The inner rod 22 is threadable into and out of the counterweight 21 via a threaded engagement such that a distance D4 between the counterweight 21 and the sliding handle 19 is configurable. The threaded engagement is disposed along an interior 43 of the counterweight 21. In other embodiments, other engagement mechanisms are provided. In yet other embodiments, the sliding handle 19 does not include a counterbore pocket 39. For example, in another embodiment, a bottom portion of the sliding handle 19 directly contacts the spring 20. In this other embodiment, the force F is generated by spring 20 tension between a top surface of the counterweight 21 and a bottom surface of the sliding handle 19.

Figure 11:
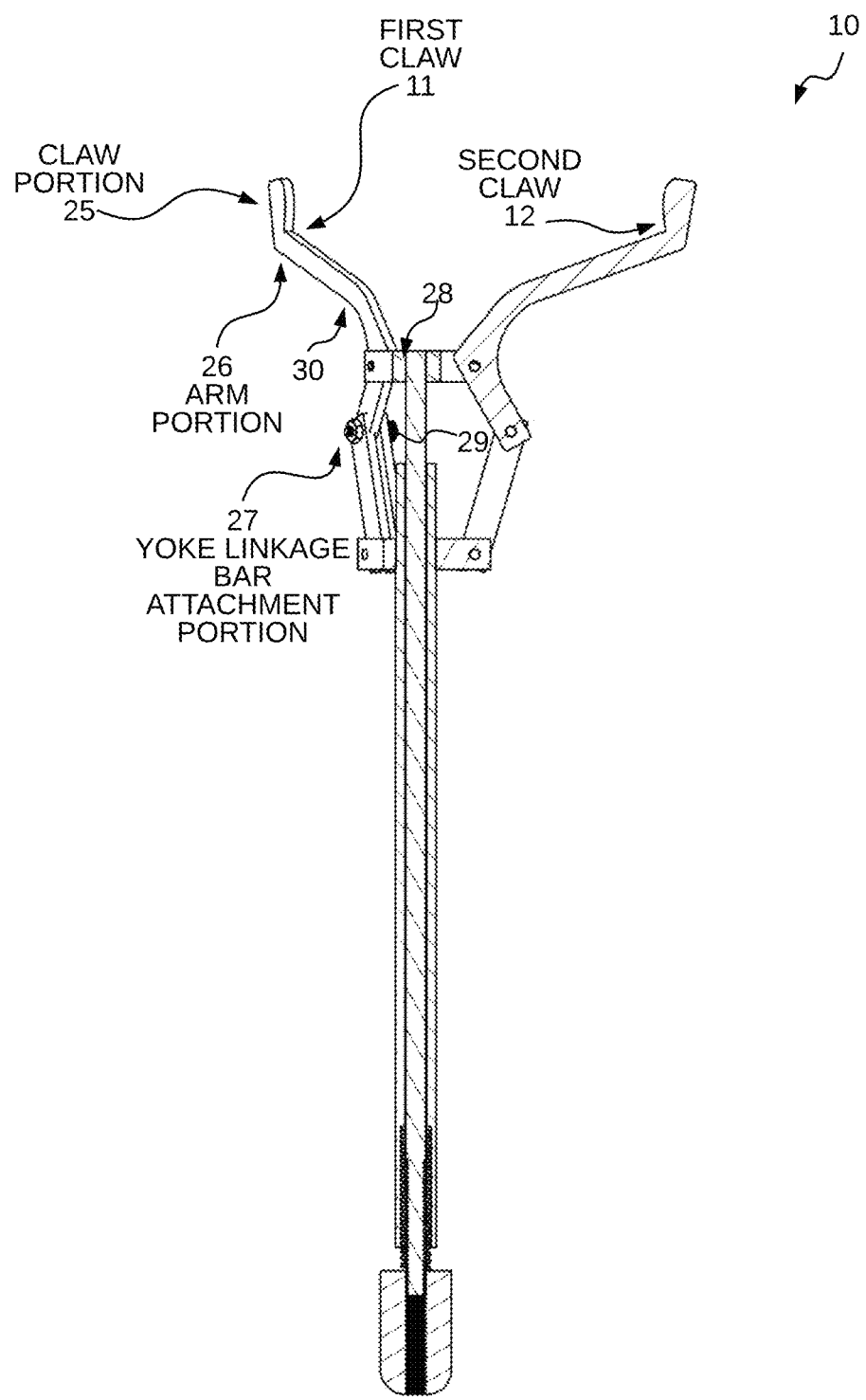
FIG. 11 is a diagram showing a cross sectional view of the clamp device 10 in the open configuration.

FIG. 11 is a diagram showing a cross sectional view of the clamp device 10 in the open configuration.

Figure 12:
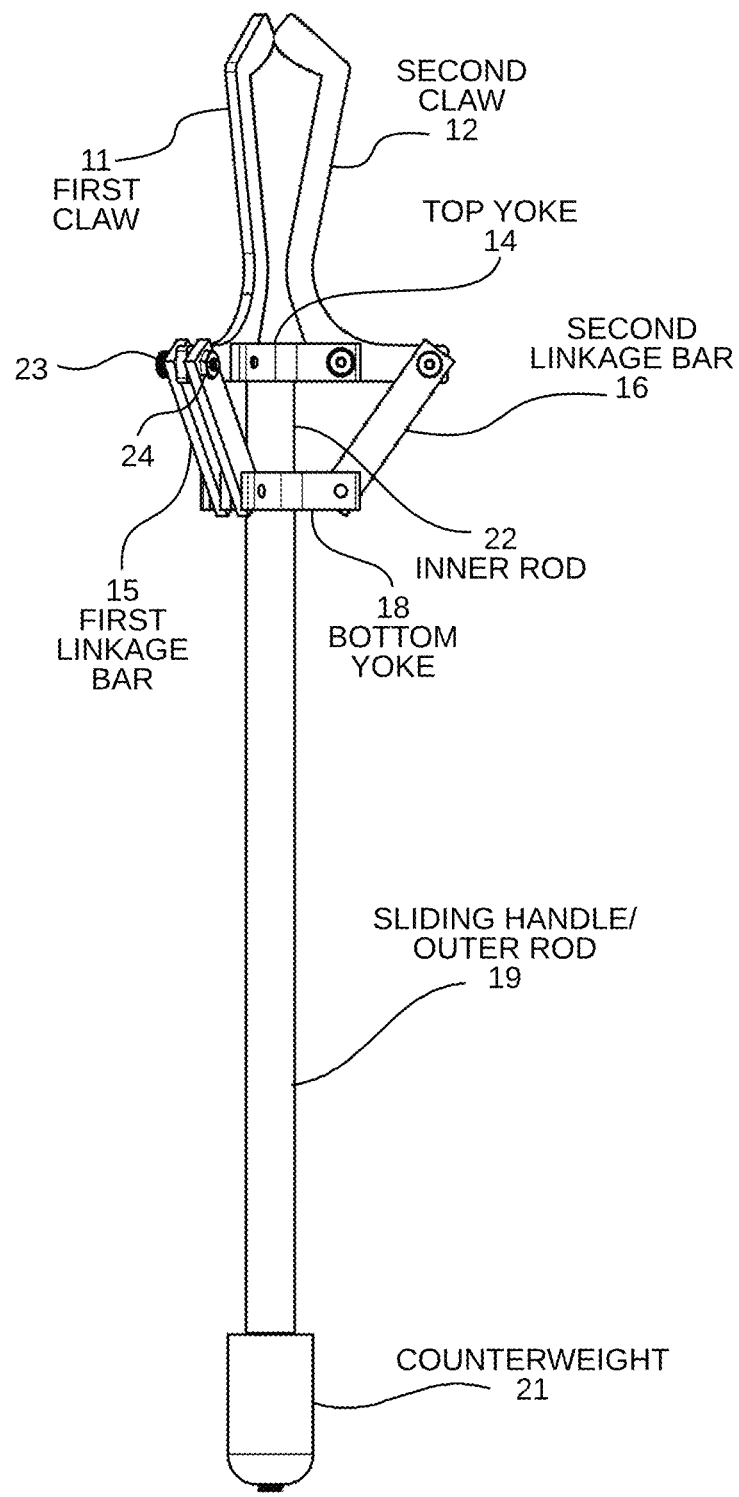
FIG. 12 is a diagram showing a side view of the clamp device 10 in a locked configuration.

FIG. 12 is a diagram showing a side view of the clamp device 10 in a locked configuration. In the locked configuration, the inner rod 22 is entirely threaded through the counterweight 21. This causes the spring 20 to be in a fully compressed state and prevents the claws 11, 12, and 13 from opening any further. This diagram shows how a portion of the inner rod 22 is visible jutting out of the counterweight 21 opening 35. In the locked configuration, the claws 11, 12, and 13 cannot be opened. The locked configuration is convenient for storage and transport of the novel clamping device 10.

Figure 13:
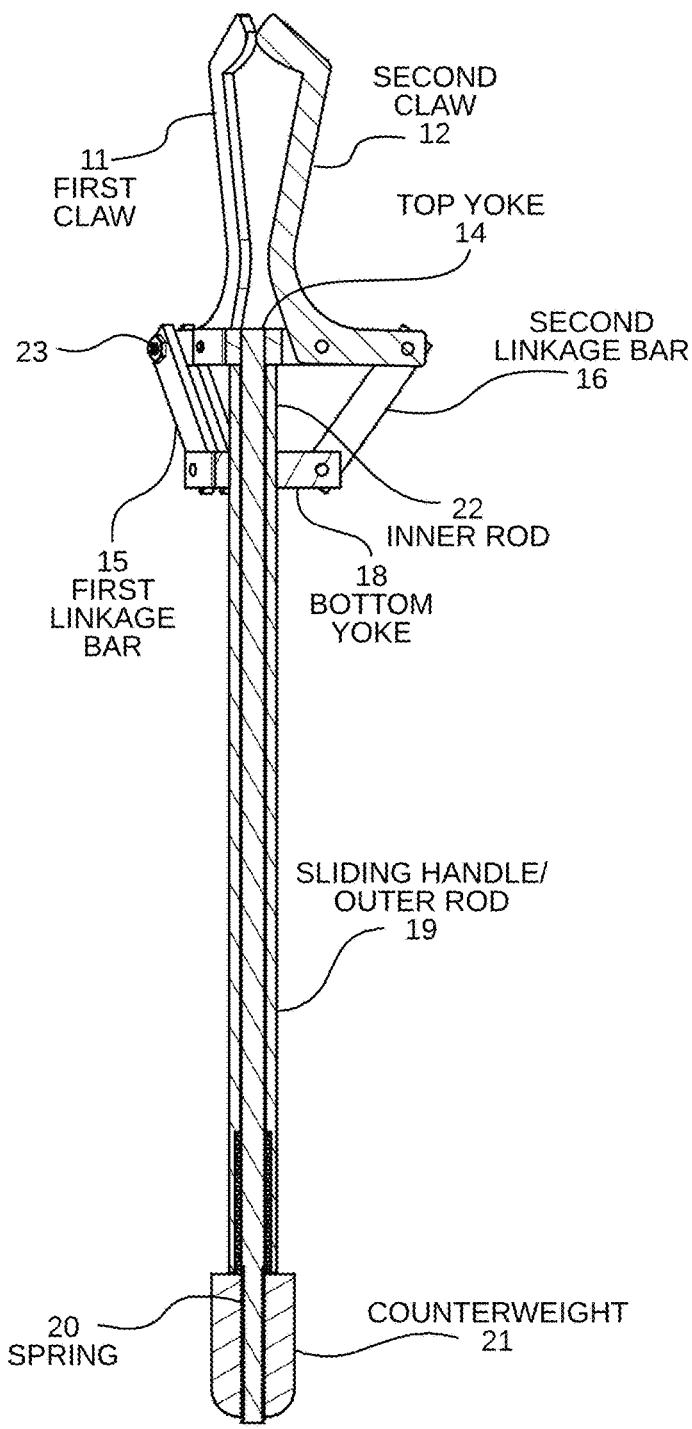
FIG. 13 is a diagram showing a cross sectional view of the clamp device 10 in the locked configuration.

FIG. 13 is a diagram showing a cross sectional view of the clamp device 10 in the locked configuration.

Figure 14:
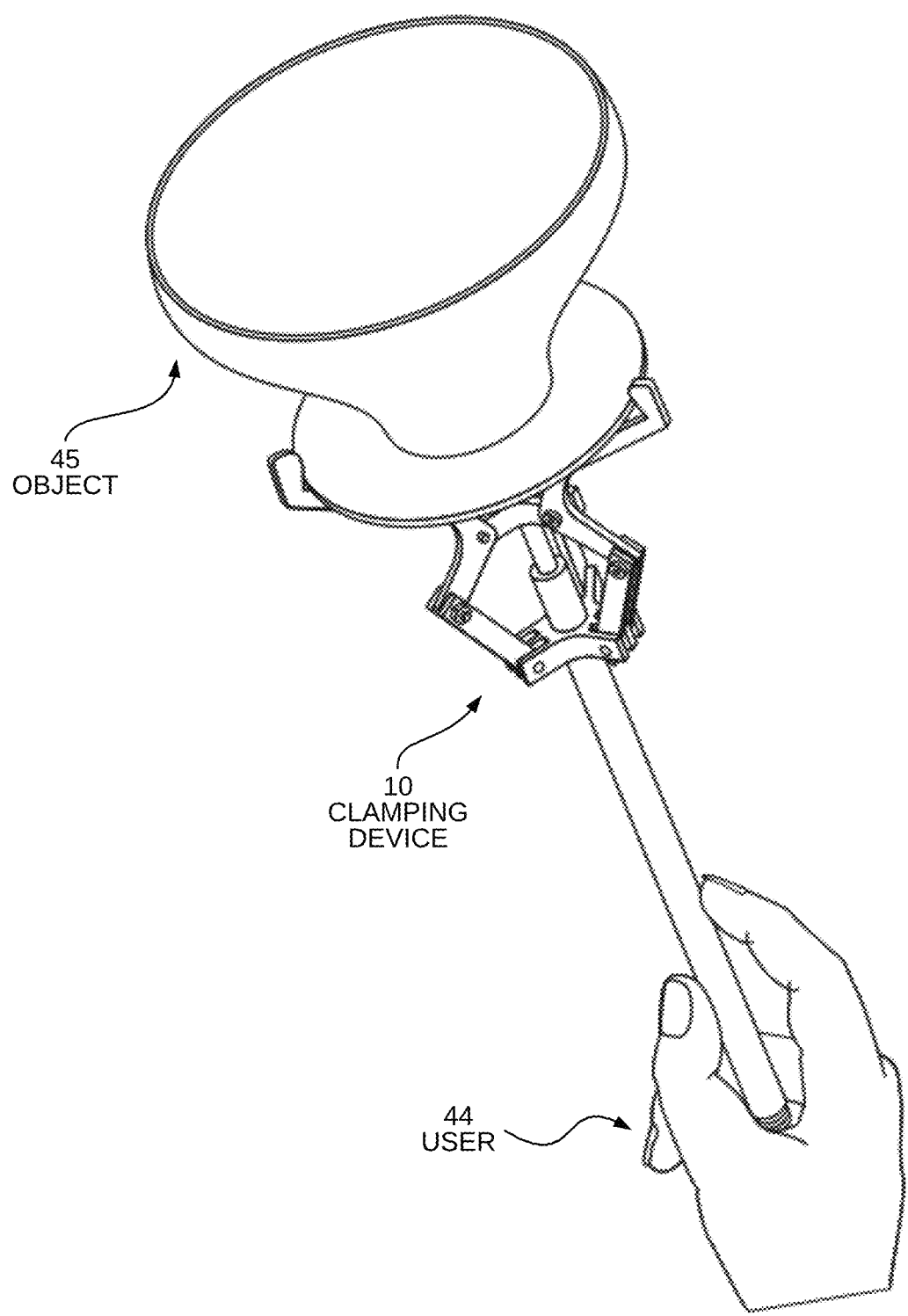
FIG. 14 is a diagram showing a perspective view of a user 44 using the clamp device 10 to clamping an object 45.

FIG. 14 is a diagram showing a perspective view of a user 44 using the clamp device 10 to clamping an object 45. In this example, the object 45 is a hot flameworked glass and the user 44 is a lampworking technician. This novel clamp 10 is usable to grasp other types of objects and objects of varying size. The novel clamp 10 is also usable in agricultural, livestock, robotics applications, and in any application involving a spring driven n-point grabbing system, where "n" represents a variable number of claws. The clamping device 10 is optimizable to grab spherical objects within a parameterized range. Modularized robotics arms or automation assistants for tasks involving spherical geometry can be constructed using this novel clamping mechanism of mechanical claw tool.

Figure 15:
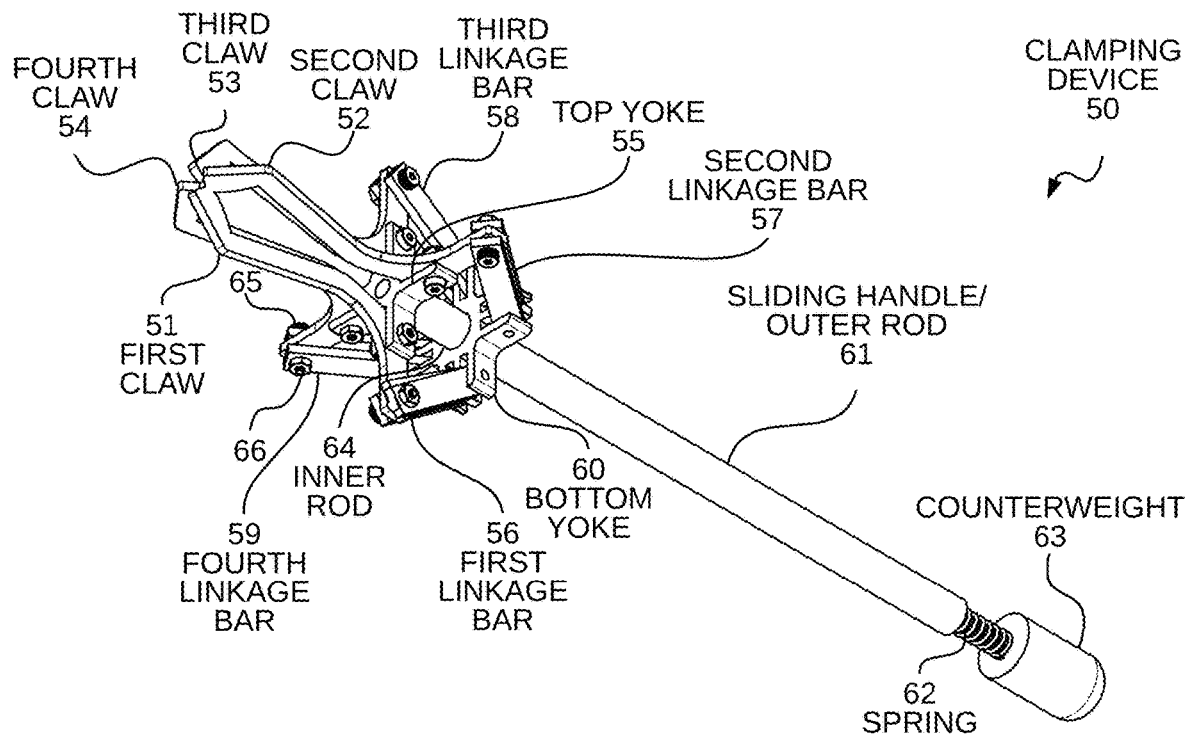
FIG. 15 is a diagram showing a perspective view of a clamp device 50 in a closed configuration.

FIG. 15 is a diagram showing a perspective view of a clamp device 50 in a closed configuration. The clamp device 50 comprises a first claw 51, a second claw 52, a third claw 53, a fourth claw 54, a top yoke 55, first linkage bar 56, second linkage bar 57, third linkage bar 58, fourth linkage bar 59, a bottom yoke 60, a sliding handle 61, a spring 62, a counterweight 63, an inner rod 64, and a plurality of fasteners 65 and 66. The clamp device 50 is a multi-claw or single claw device. In this example, the clamp device 50 includes four claws 51, 52, 53, and 55 used to clamp an object.

The sliding handle 61 surrounds and slides about the inner rod 64. The inner rod is coupled to the counterweight 63. The spring 62 surrounds a portion of the inner rod 64. The spring 62 pushes against the counterweight 63 and applies force to the sliding handle 61. The sliding handle 61 is also referred to as an "outer rod" and the inner rod 64 is also referred to as a "central rod". The top yoke 55 is coupled to the inner rod 64. Each of the claws 51, 52, 53, and 54 is coupled to the top yoke 55. The bottom yoke 60 is coupled to the sliding handle 61. Each of the counterweight 63, the top yoke 55, and the bottom yoke 60 is also referred to as a "support".

Each of the claws 51, 52, 53, and 54 is coupled to the bottom yoke 60 via one or more linkage bars. In this embodiment, each of the claws 51, 52, 53, and 54 is coupled to the bottom yoke 60 via two linkage bars. The first claw 51 is coupled to the bottom yoke 60 via first linkage bars 56. The second claw 52 is coupled to the bottom yoke 60 via second linkage bars 57. The third claw 53 is coupled to the bottom yoke 60 via third linkage bars 60. The fourth claw 54 is coupled to the bottom yoke 60 via fourth linkage bars 59. In other embodiments, only one linkage bar is used to couple each claw to the bottom yoke 60. In still other embodiments, more than two linkage bars are used to couple each claw to the bottom yoke 60. Each of the claws 51, 52, 53, and 54 is also referred to as "grabbing members", "grabbing elements", "fingers".

The top yoke 55, the claws 51, 52, 53, and 54, the linkage bars 56, 57, 58, and 59, and the bottom yoke 60 form four-bar mechanical linkages. These four-bar linkages or "four-bars" provide a symmetrical clamping force across all claws of the novel clamping device 50 independent of orientation of the clamping device 50 and independent of the position of the clamping device 50 when being opened or closed. This is a significant advantage over known clamps which depend on gravity to supply a symmetrical clamping force. For example, conventional clamps require a user to open the clamp while fully upright and clamp an object while maintaining the clamp in a fully upright orientation, otherwise, an object will not be clamped symmetrical within the claws.

Figure 16:
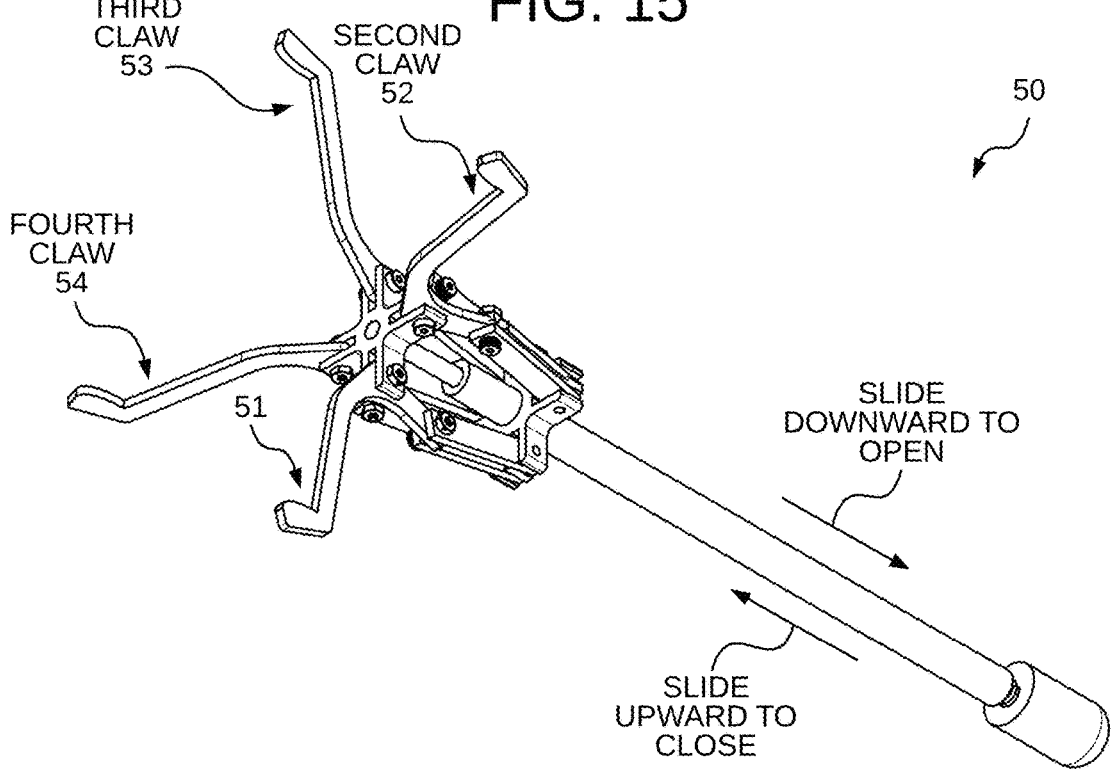
FIG. 16 is a diagram showing a perspective view of the clamp device 50 in an open configuration.

FIG. 16 is a diagram showing a perspective view of the clamp device 50 in an open configuration. The clamp device 50 transitions between the open and closed configurations via the sliding handle 61. To transition to the open configuration, the sliding handle 61 is slid downward towards the counterweight 63. To transition to the closed configuration, the sliding handle 61 is slid upwards away from the counterweight 63. In the open configuration, an object is inserted between the claws 51, 52, 53, and 54. Once the object is in a desired orientation, the sliding handle is slid upwards away from the counterweight 63 causing the claws 51, 52, 53, and 54 to clamp the object.

Figure 17:
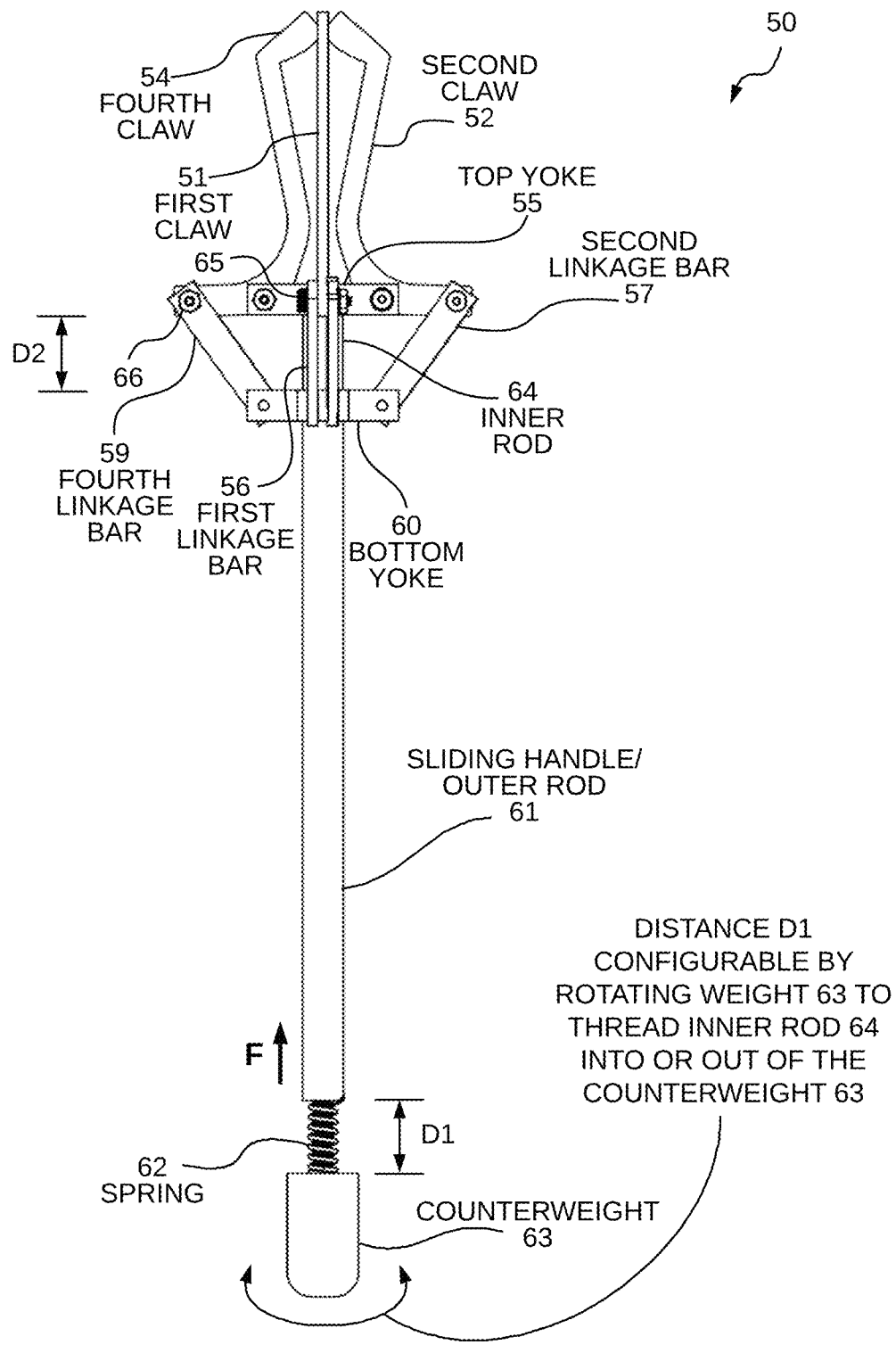
FIG. 17 is a diagram showing a side view of the clamp device 50 in the closed configuration.

FIG. 17 is a diagram showing a side view of the clamp device 50 in the closed configuration. In the closed configuration, spring 62 applies a spring force F to the sliding handle 61 (see detail in FIG. 23.) This spring force F maintains a distance D1 between the sliding handle 61 and the counterweight 63 and maintains the clamp device 50 in the closed configuration.

In accordance with at least one novel aspect, the counterweight 63 is rotated counterclockwise or clockwise to increase the distance D1 (reducing spring tension) or decrease the distance D1 (increasing spring tension). When the counterweight 63 is rotated clockwise, the inner rod 64 is threaded down into an interior of the counterweight 63. When the counterweight 63 is rotated counterclockwise, the inner rod 64 is threaded up through the interior of the counterweight 63. Adjusting the distance D1 changes the opening range of claws 51, 52, 53, and 54.

Figure 18:
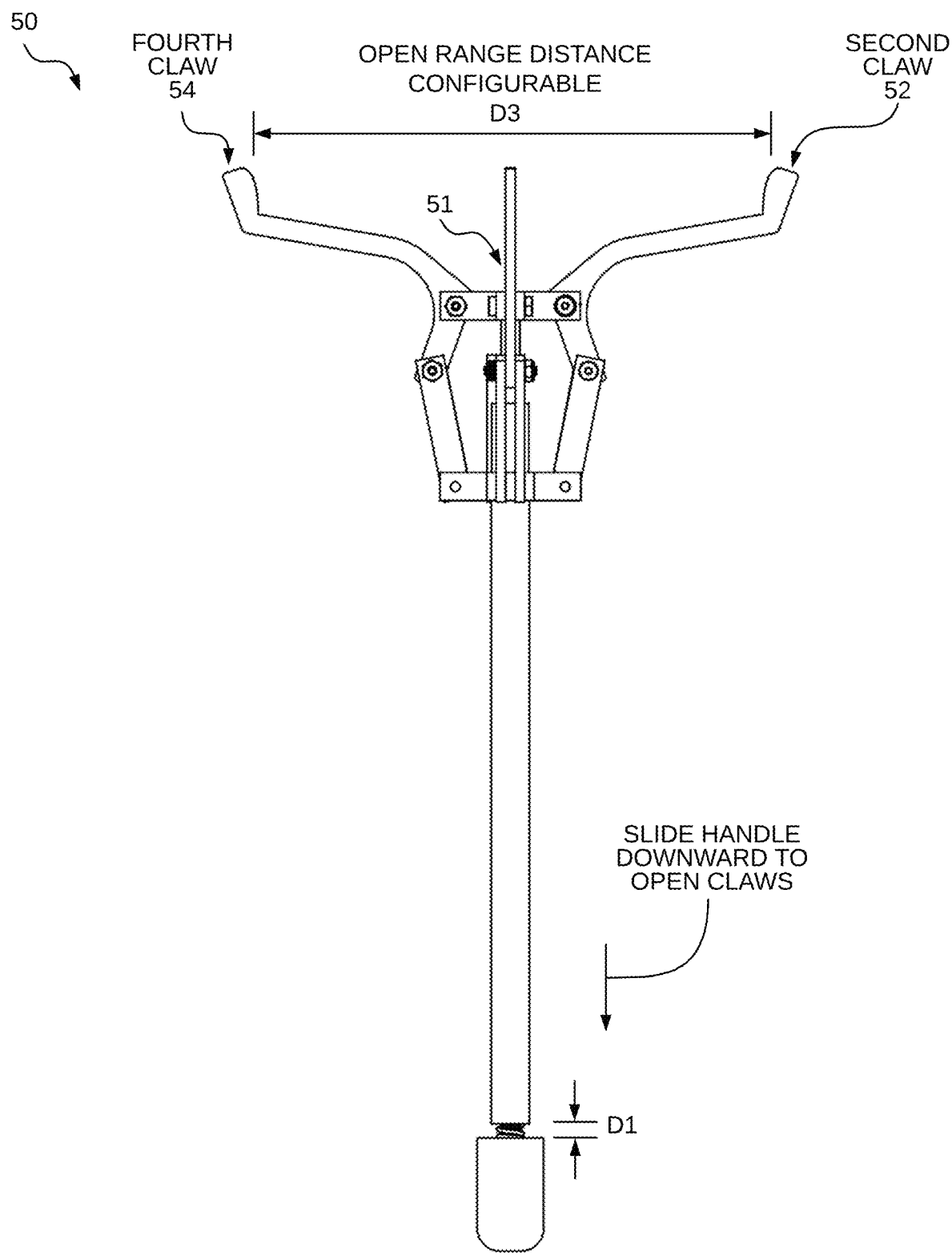
FIG. 18 is a diagram showing a side view of the clamp device 50 in the open configuration.

FIG. 18 is a diagram showing a side view of the clamp device 50 in the open configuration. To transition to the open configuration, the sliding handle 61 is slid downward towards the counterweight 63. The distance D1 between the sliding handle 61 and the counterweight 63 decreases. This in turn causes the linkage bars 56, 57, 58, and 59 to rotate downward thereby causing the claws 51, 52, 53, and 54 to rotate open.

Figure 19:
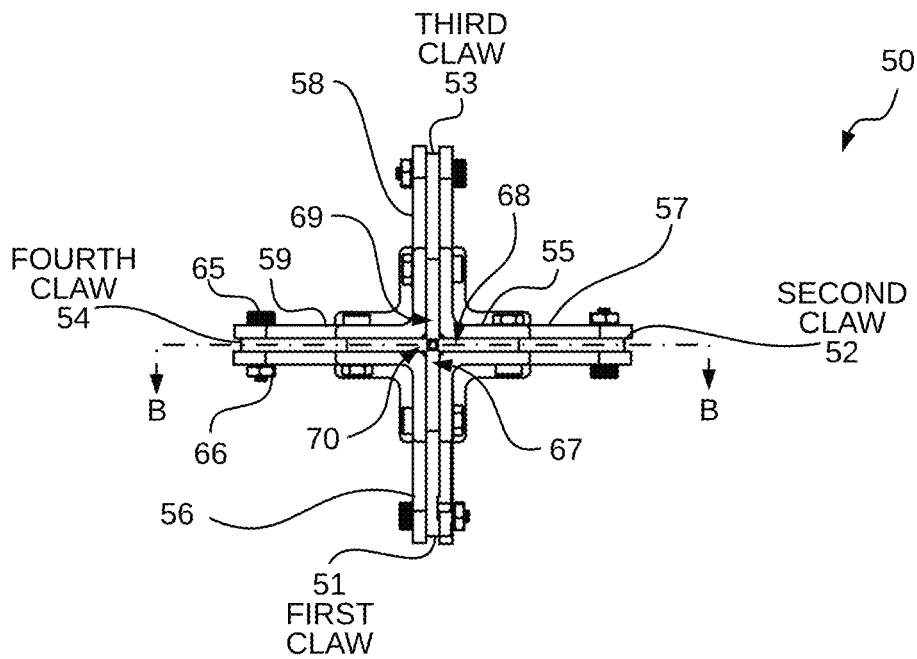
FIG. 19 is a diagram showing a top-down view of the clamp device 50 in the closed configuration.

FIG. 19 is a diagram showing a top-down view of the clamp device 50 in the closed configuration. The top yoke 55 includes a plurality of slots that retain each of the claws 51, 52, 53, and 54 and allow the claws 51, 52, 53, and 54 to rotate open and closed. The first claw 51 is rotatably coupled to the top yoke 55 via the first slot 67. The second claw 52 is rotatably coupled to the top yoke 55 via the second slot 68. The third claw 53 is rotatably coupled to the top yoke 55 via the third slot 69. The fourth claw 54 is rotatably coupled to the top yoke 55 via the fourth slot 70.

Figure 20:
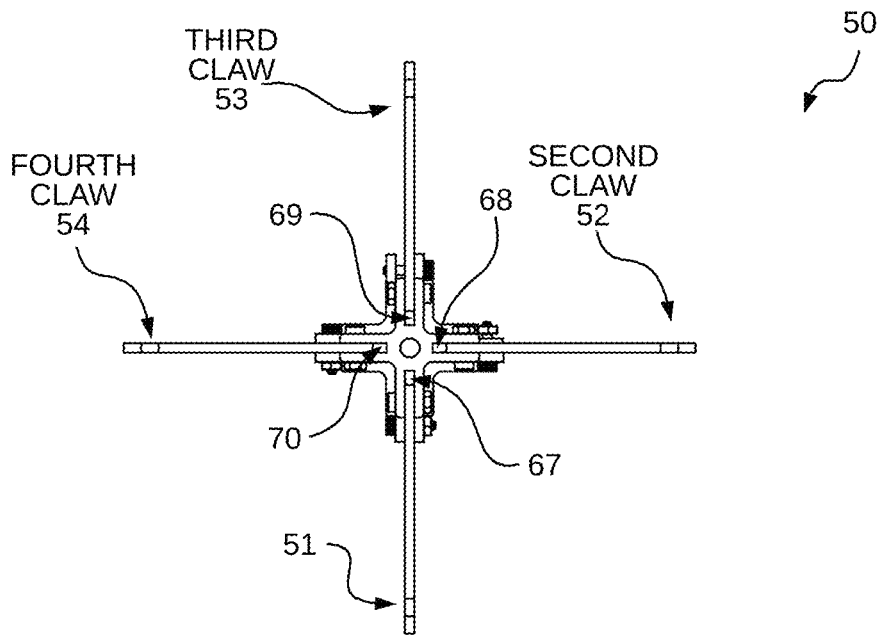
FIG. 20 is a diagram showing a top-down view of the clamp device 50 in the open configuration.

FIG. 20 is a diagram showing a top-down view of the clamp device 50 in the open configuration.

Figure 21:
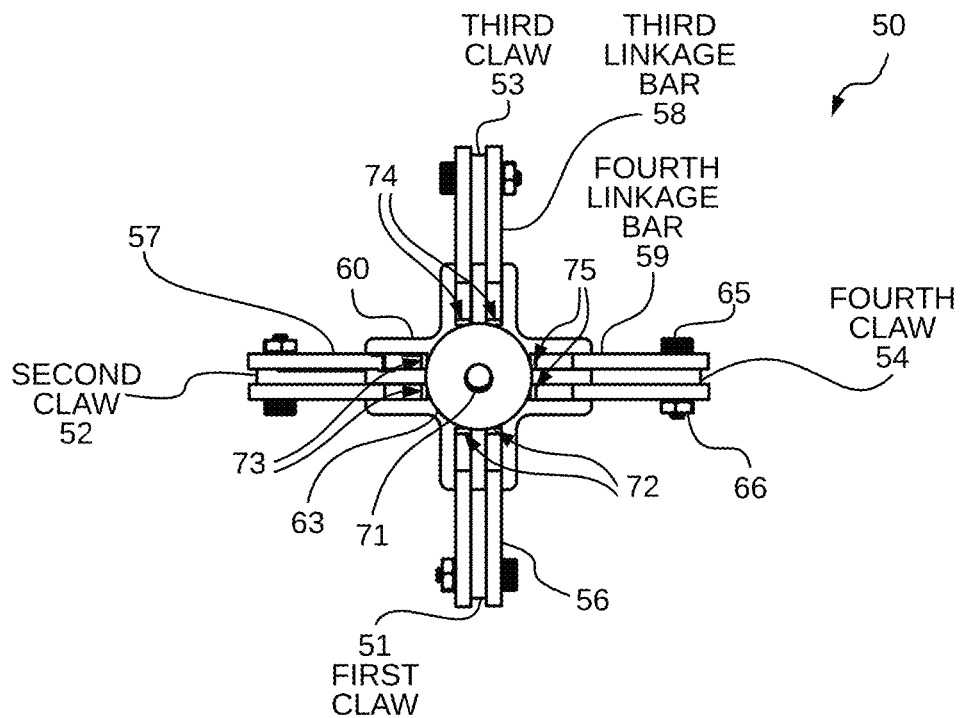
FIG. 21 is a diagram showing a bottom-up view of the clamp device 50 in the closed configuration.

FIG. 21 is a diagram showing a bottom-up view of the clamp device 50 in the closed configuration. The bottom yoke 60 includes a plurality of slots that retain each of the linkage bars 56, 57, 58, and 59 and allow the linkage bars 56, 57, 58, and 59 to rotate open and closed. The first linkage bars 56 are rotatably coupled to the bottom yoke 60 via first slots 72. The second linkage bars 57 are rotatably coupled to the bottom yoke 60 via second slots 73. The third linkage bars 58 are rotatably coupled to the bottom yoke 60 via third slots 74. The fourth linkage bars 59 are rotatably coupled to the bottom yoke 60 via fourth slots 75. In embodiments where each claw is coupled via only one linkage bar, only one slot may be provided for rotatable attachment to the bottom yoke 60.

Figure 22:
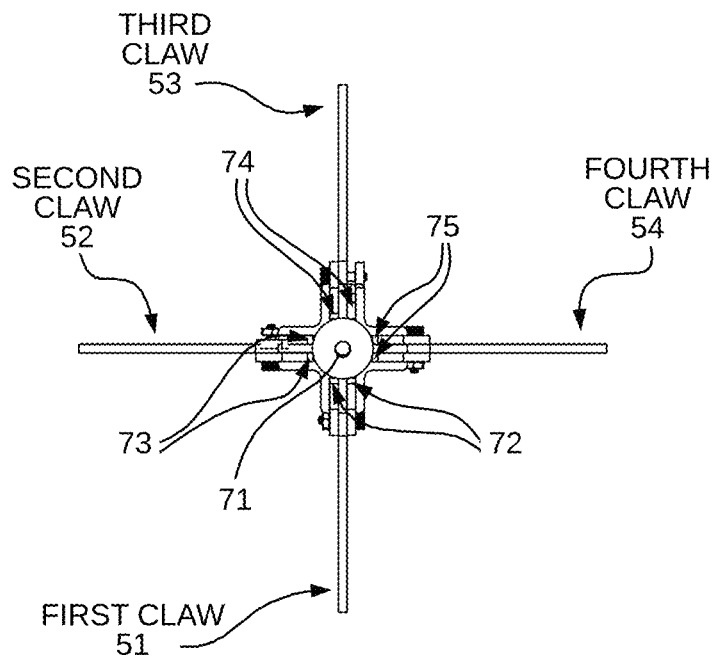
FIG. 22 is a diagram showing a bottom-up view of the clamp device 50 in the open configuration.

FIG. 22 is a diagram showing a bottom-up view of the clamp device 50 in the open configuration. Reference numeral 71 identifies an opening within the counterweight 63. The inner rod 64 screws in and out of this opening 71 via a threaded engagement.

Figure 23:
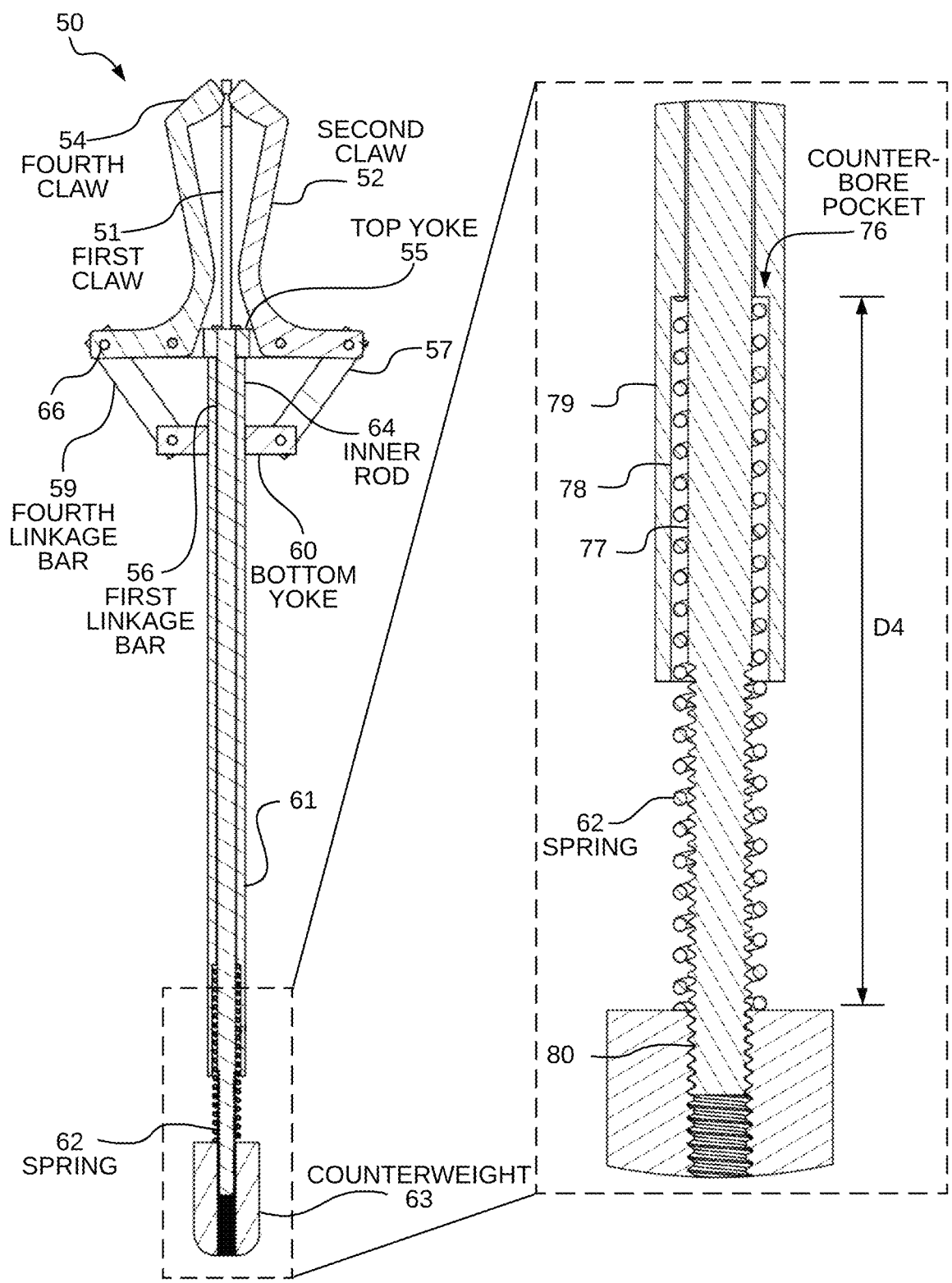
FIG. 23 is a diagram showing a cross sectional view of the clamp device 50 in the closed configuration.

FIG. 23 is a diagram showing a cross sectional view of the clamp device 50 in the closed configuration. An expanded view is included that shows how the spring 62 engages with the sliding handle 61 and the counterweight 63. The spring 62 surrounds an outer surface 77 of the inner rod 64. Part of the spring 62 is disposed between an interior surface 78 of the sliding handle 61 and the outer surface 77 of the inner rod 64. A first end or lower end of the spring 62 contacts the counterweight 63. A second end or upper end of the spring 62 contacts the sliding handle 61 and the spring 62 applies force F to the sliding handle 61. In this embodiment, the force F is generated by spring 62 tension between a top surface of the counterweight 63 and the counterbore pocket 76 contact surface.

A user slides the sliding handle 61 by grasping the outer surface 79 of the sliding handle. In this embodiment, the spring 62 contacts the sliding handle 61 via a counter bore pocket 76. The inner rod 64 is threadable into and out of the counterweight 63 via a threaded engagement such that a distance D4 between the counterweight 63 and the sliding handle 61 is configurable. The threaded engagement is disposed along an interior 80 of the counterweight 63. In other embodiments, other engagement mechanisms are provided. In yet other embodiments, the sliding handle 61 does not include a counterbore pocket 76. For example, in another embodiment, a bottom portion of the sliding handle 61 directly contacts the spring 62. In this other embodiment, the force F is generated by spring 62 tension between a top surface of the counterweight 63 and a bottom surface of the sliding handle 61.

Figure 24:
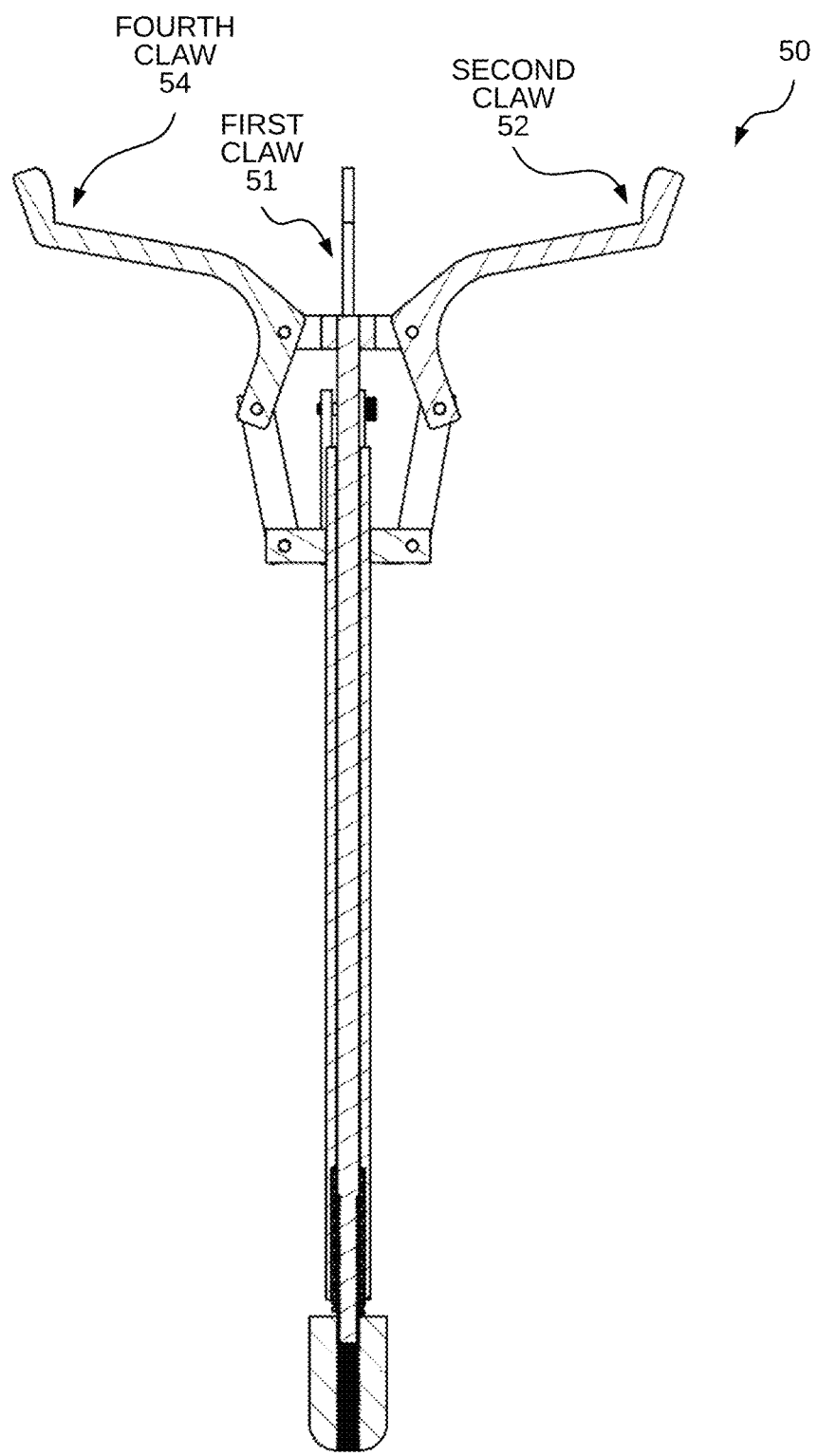
FIG. 24 is a diagram showing a cross sectional view of the clamp device 50 in the open configuration.

FIG. 24 is a diagram showing a cross sectional view of the clamp device 50 in the open configuration.

Figure 25:
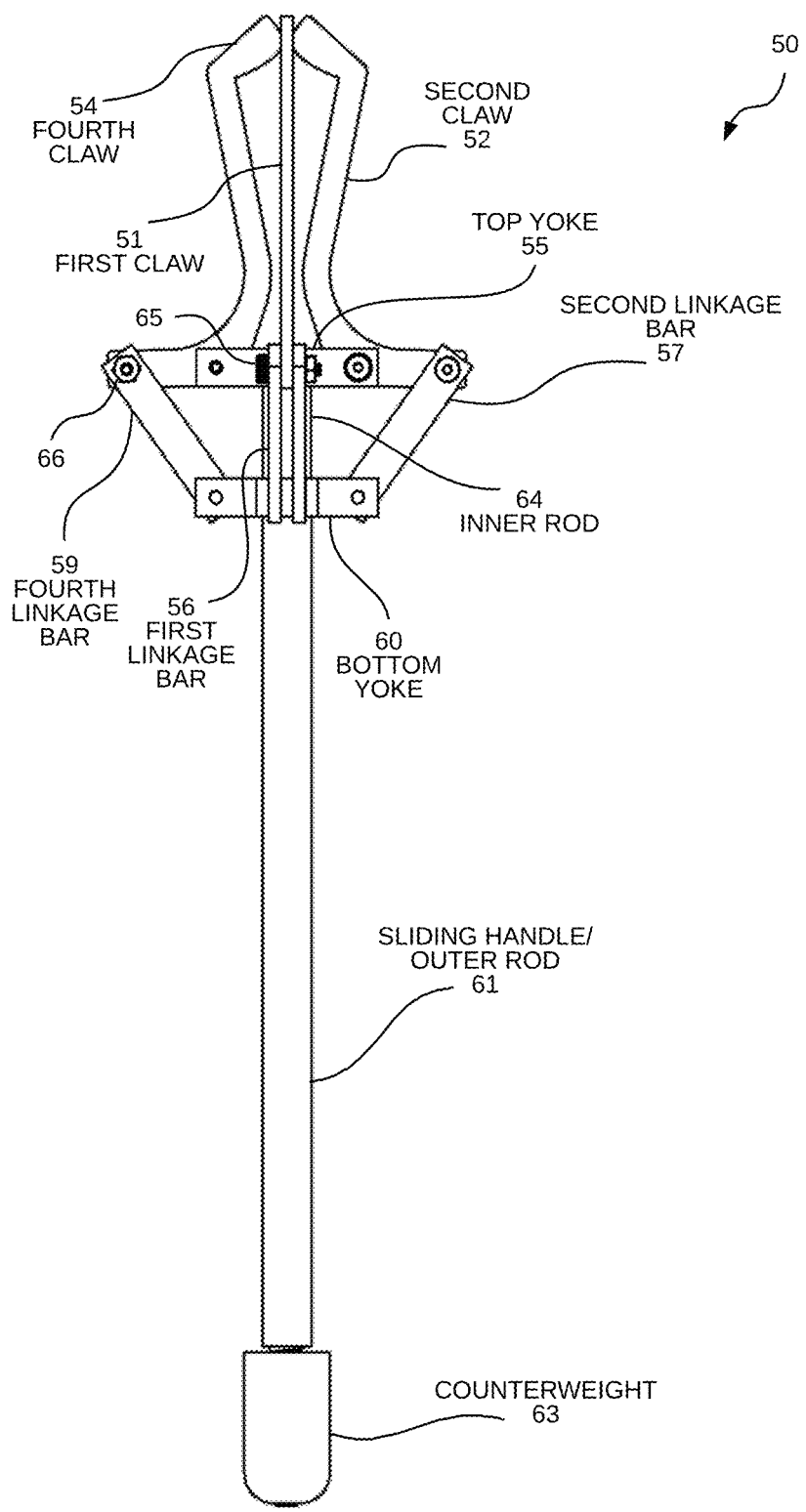
FIG. 25 is a diagram showing a side view of the clamp device 50 in a locked configuration.

FIG. 25 is a diagram showing a side view of the clamp device 50 in a locked configuration. In the locked configuration, the inner rod 64 is entirely threaded through the counterweight 63. This causes the spring 62 to be in a fully compressed state and prevents the claws 51, 52, 53, and 54 from opening any further. This diagram shows how a portion of the inner rod 64 is visible jutting out of the counterweight 63 opening 71. In the locked configuration, the claws 51, 52, 53, and 54 cannot be opened. The locked configuration is convenient for storage and transport of the novel clamping device 50.

Figure 26:
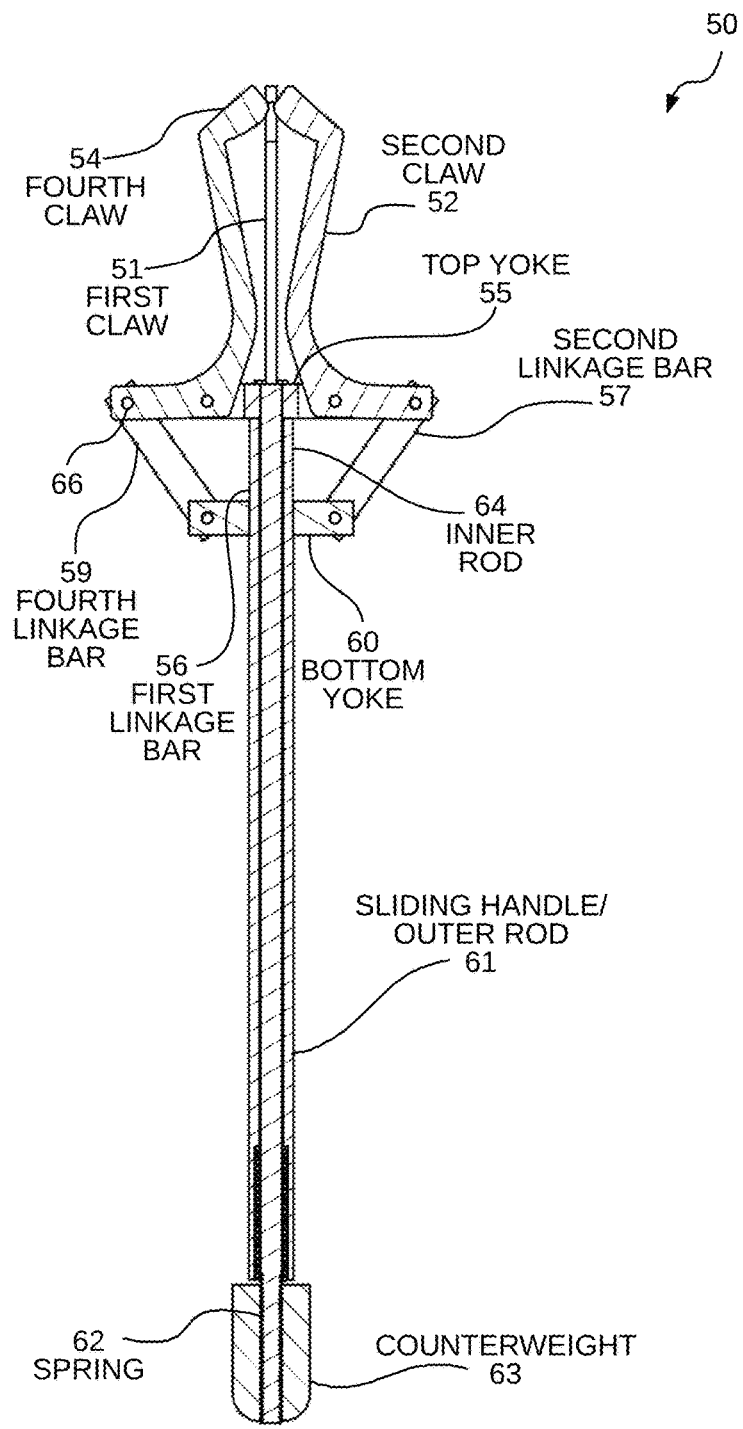
FIG. 26 is a diagram showing a cross sectional view of the clamp device 50 in the locked configuration.

FIG. 26 is a diagram showing a cross sectional view of the clamp device 50 in the locked configuration.

Figure 27:
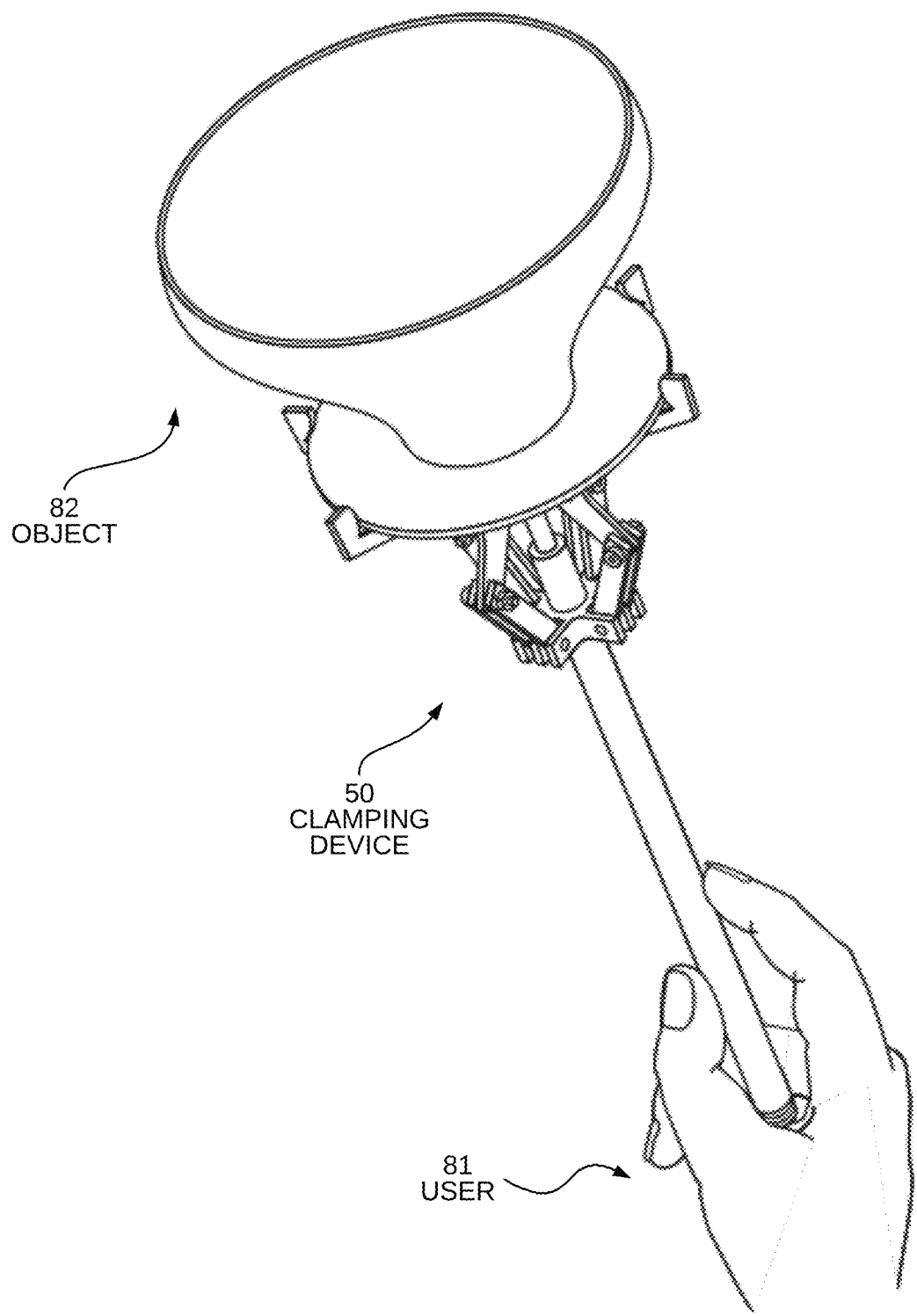
FIG. 27 is a diagram showing a perspective view of a user 81 using the clamp device 50 to clamping an object 82.

FIG. 27 is a diagram showing a perspective view of a user 81 using the clamp device 50 to clamping an object 82. In this example, the object 82 is a hot flameworked glass and the user 81 is a lampworking technician.

Figure 28:
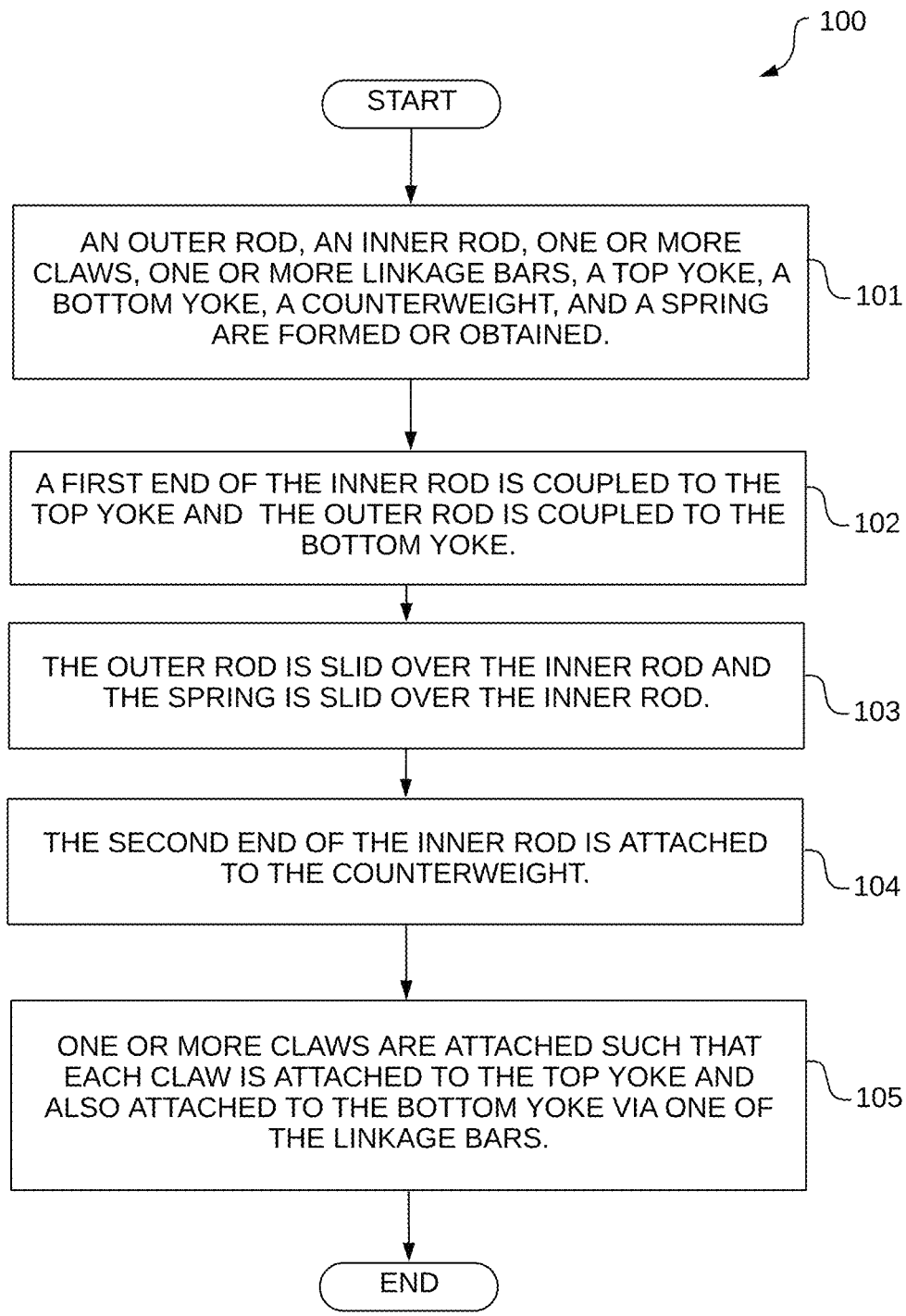
FIG. 28 is a flowchart of a method 100 in accordance with one novel aspect.

FIG. 28 is a flowchart of a method 100 in accordance with one novel aspect. Method 100 is but one method of manufacturing a novel clamp device in accordance with various disclosed embodiments. In a first step (step 101), an outer rod, an inner rod, one or more claws, one or more linkage bars, a top yoke, a bottom yoke, a counterweight, and a spring are formed or obtained. In a second step (step 102), a first end of the inner rod is coupled to the top yoke and the outer rod is coupled to the bottom yoke. In a third step (step 103), the outer rod is slid over the inner rod and the spring is slid over the inner rod. In a fourth step (step 104), the second end of the inner rod is attached to the counterweight. In a fifth step (step 105), one or more claws are attached such that each claw is attached to the top yoke and also attached to the bottom yoke via one of the linkage bars. Any of the above steps may involve welding, forging, additive manufacturing (3D printing, etc.), subtractive manufacturing (CNC machining, etc.), injection molding, or other types of manufacturing techniques.

Figure 29:
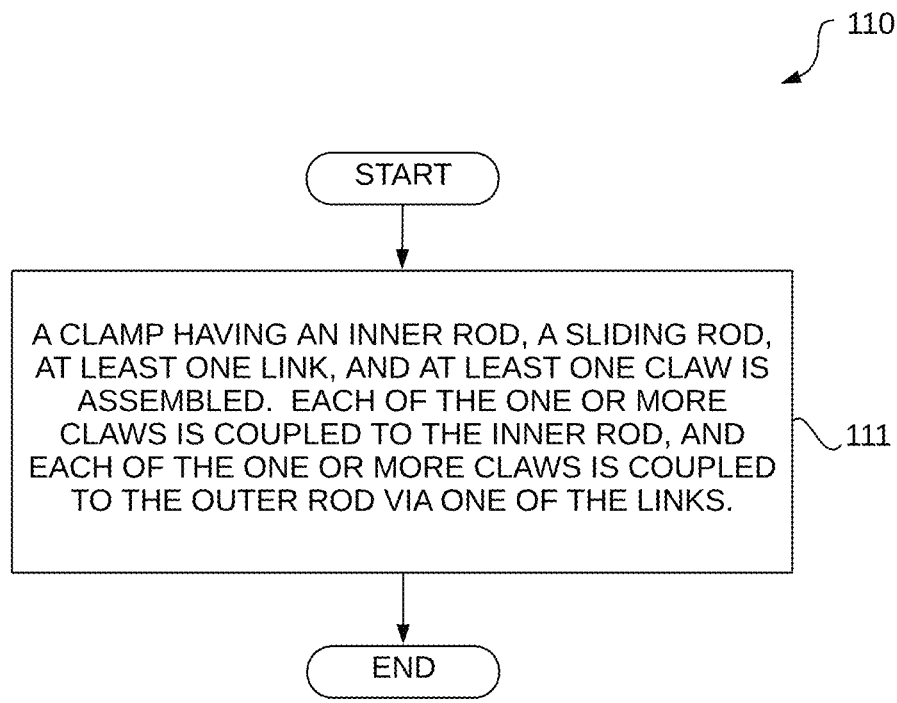
FIG. 29 is a flowchart of a method 110 in accordance with one novel aspect.

FIG. 29 is a flowchart of a method 110 in accordance with one novel aspect. In a first step (step 111), a clamp having an inner rod, a sliding rod, at least one link, and at least one claw is assembled. Each of the one or more claws is coupled to the inner rod, and each of the one or more claws is coupled to the outer rod via one of the links.

Figure 30:
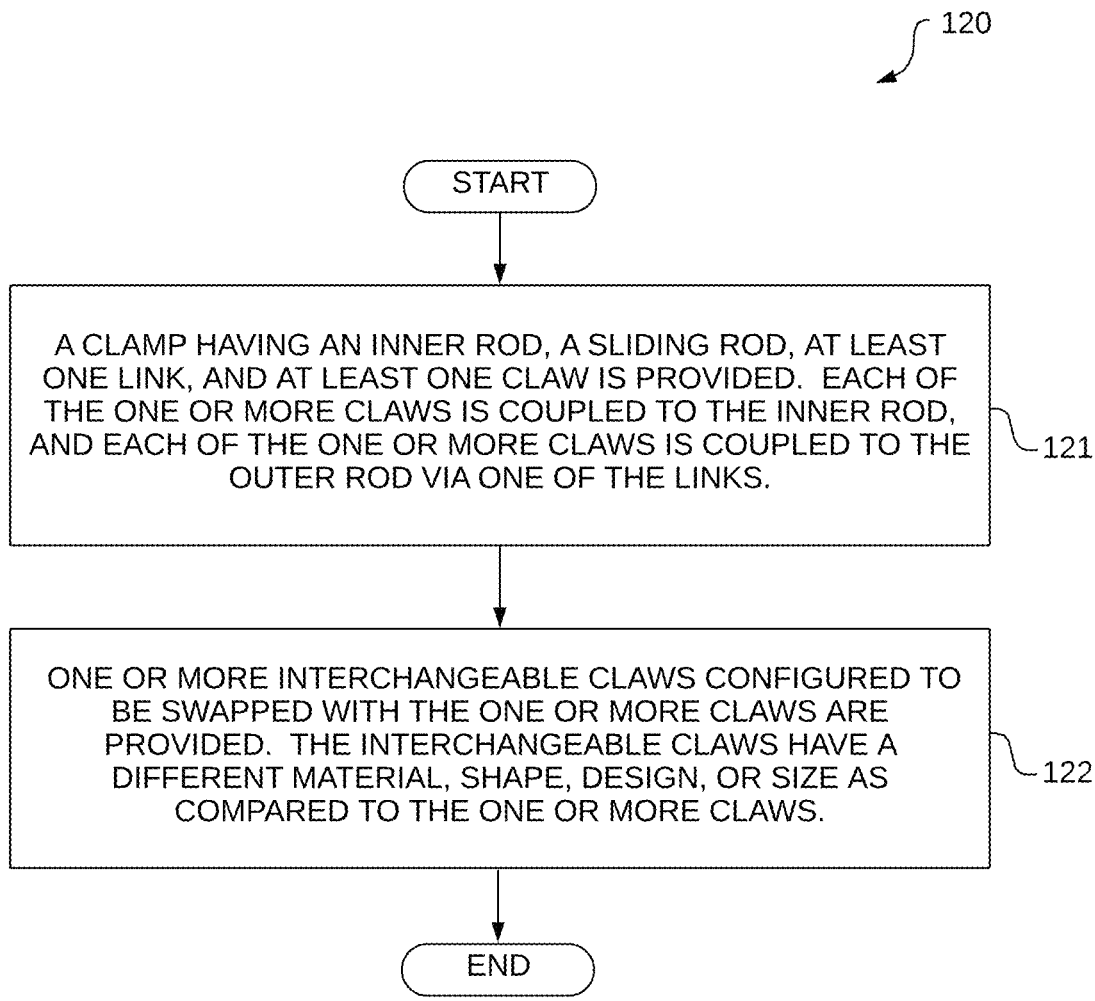
FIG. 30 is a flowchart of a method 120 in accordance with one novel aspect.

FIG. 30 is a flowchart of a method 120 in accordance with one novel aspect. In a first step (step 121), a clamp having an inner rod, a sliding rod, at least one link, and at least one claw is provided. Each of the one or more claws is coupled to the inner rod, and each of the one or more claws is coupled to the outer rod via one of the links. In a second step (step 122), one or more interchangeable claws configured to be swapped with the one or more claws are provided. The interchangeable claws optionally have a different material, shape, design, or size as compared to the one or more claws.

Figure 31:
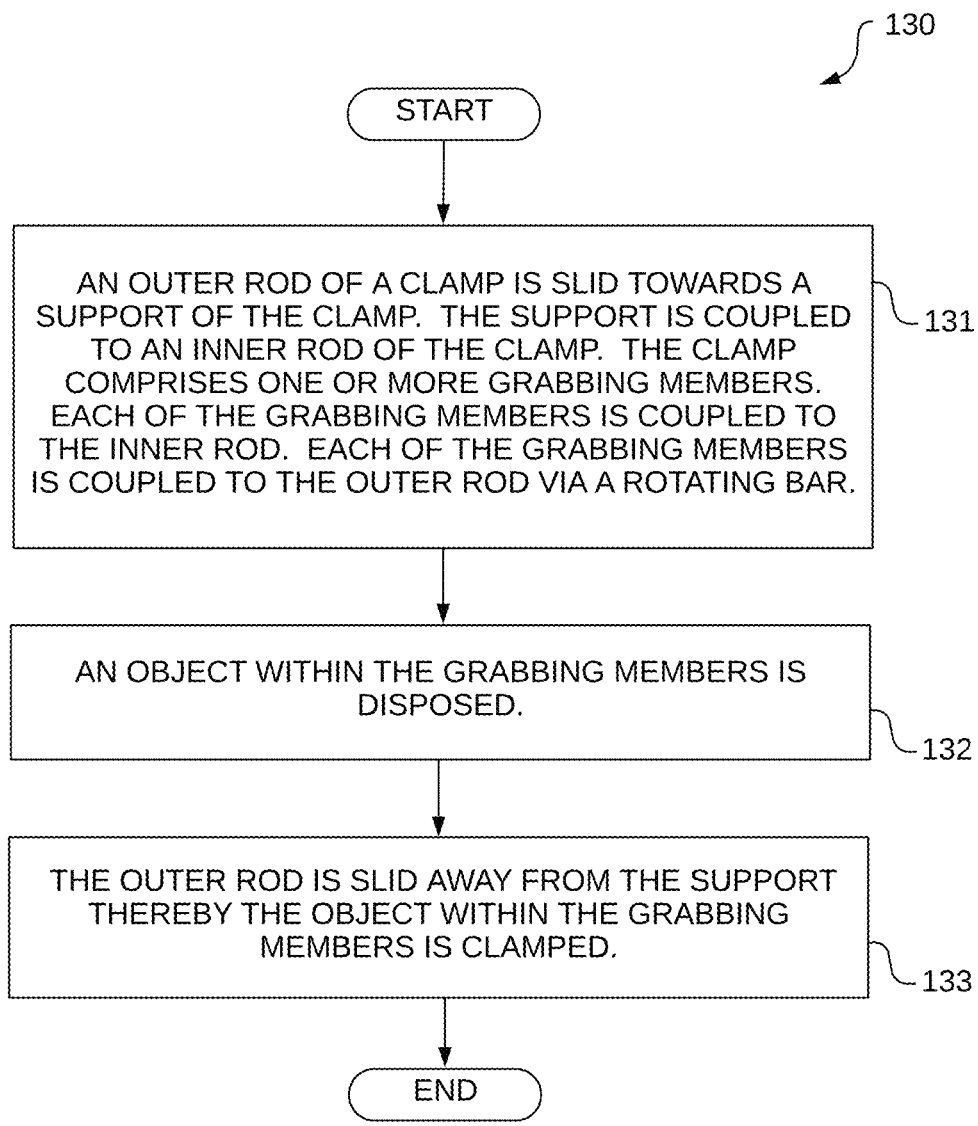
FIG. 31 is a flowchart of a method 130 in accordance with one novel aspect.

FIG. 31 is a flowchart of a method 130 in accordance with one novel aspect. In a first step (step 131), an outer rod of a clamp is slid towards a support of the clamp. The support is coupled to an inner rod of the clamp. The clamp comprises one or more grabbing members. Each of the grabbing members is coupled to the inner rod. Each of the grabbing members is coupled to the outer rod via a rotating bar. In a second step (step 132), an object is disposed within the grabbing members. In a third step (step 133), the outer rod is slid away from the support and the object within the grabbing members is clamped.

Figure 32:
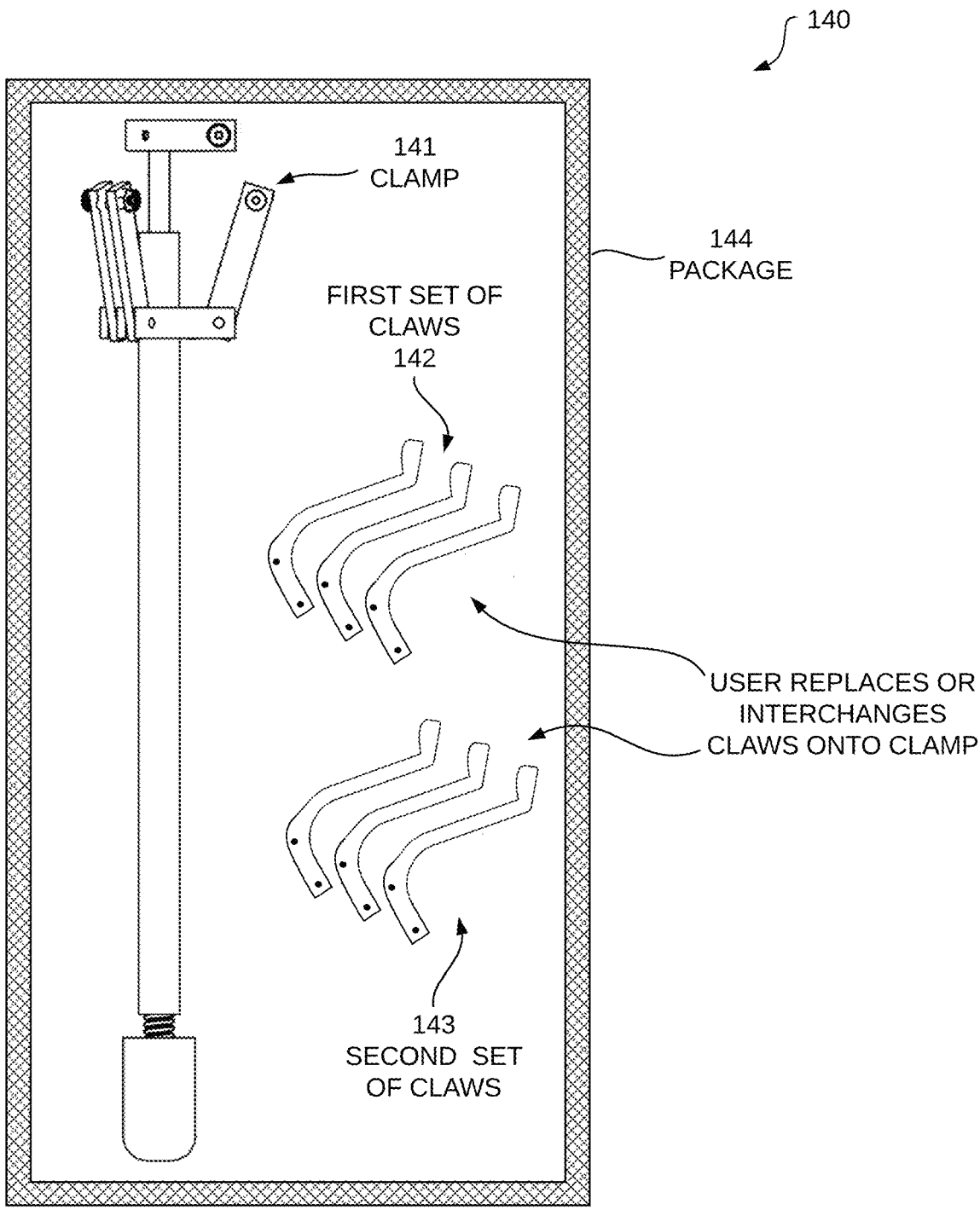
FIG. 32 is a diagram of a packaged four-bar clamp device 140.

FIG. 32 is a diagram of a packaged four-bar clamp device 140. The packaged four-bar clamp device 140 includes a novel four-bar clamp 141, a first set of claws 142, a second set of claws 143, and packaging material 144. A user is able to swap in different types of claws based on desired applications. The four-bar clamp 141 is of a similar construction as novel clamp 10 shown in FIG. 1, however, it is appreciated that any four-bar clamp may be packaged or provided to users in this swappable fashion. In addition, the four-bar clamps disclosed above also provide replacement functionality such that their claws can be replaced with new claws or with different types of claw designs.

FIG. 33 is a diagram showing a plurality of claws 150 having various shapes, sizes, and designs. Each claw may have different shape, thickness, length, orientation, design, or material characteristics depending on desired clamping characteristics. Different claw designs provide different gripping characteristics and different diameter gripping range. Contours and angles of the claws are also available. For example, claw 151 is a smaller grabber and particularly suited for small spherical handling. Claw 152 has a grabbing range between 30 mm to 100 mm and is particularly suitable for deep claw applications, such as for cups and vessel work. Claw 153 has a grabbing range between 25 mm to 150 mm and is also suitable for deep claw applications, such as for cups and vessel work.

Figure 34:
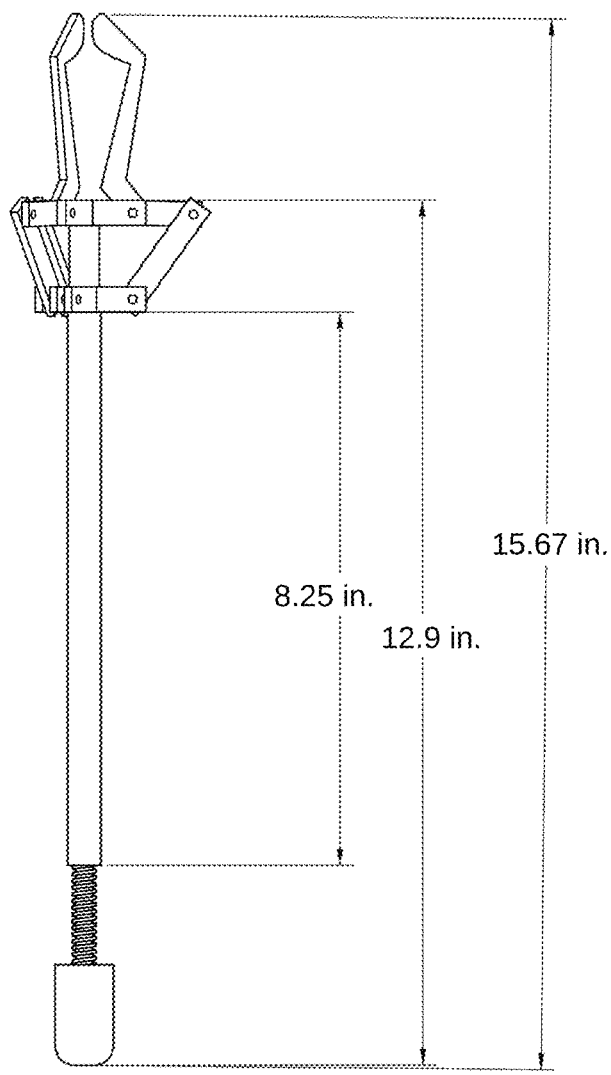
FIG. 34 is a diagram of a side view of a novel four-bar clamp with exemplary dimensions.

FIG. 34 is a diagram of a side view of a novel four-bar clamp with exemplary dimensions.

Figure 35:
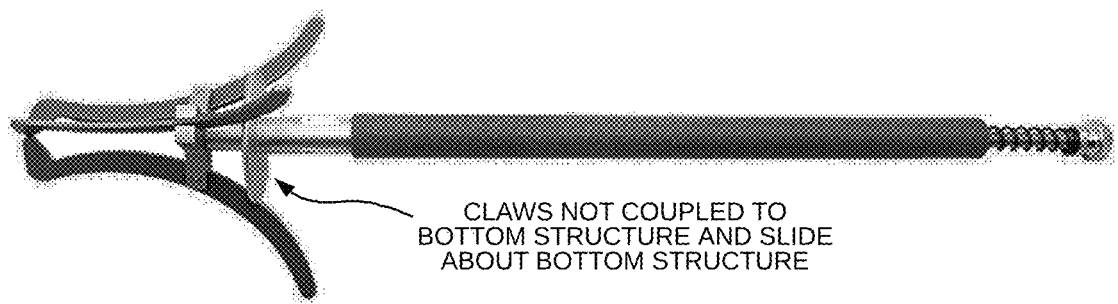
FIG. 35 is a diagram of a conventional holder.

FIG. 35 is a diagram of a conventional holder. The conventional holder shown in FIG. 35 does not have any four-bar linkages. This conventional holder shown in FIG. 35 is available from Herbert Arnold and can be purchased from Mountain Glass Arts, Inc. at 191 Lyman Street, Unit 400, Asheville, N.C. 28801 or from their website at https://www.mountainglass.com. Each claw of the conventional holder attaches at only one location, not two locations as the novel clamping devices 10 and 50. In addition, Each claw of the conventional holder slides freely about a bottom structure and no claw is coupled to this bottom structure. This results in asymmetric application of clamping force, unless the conventional holder is perfectly upright thereby limiting usage and flexibility as compared to novel clamping devices 10 and 50.

Although certain specific embodiments are described above for instructional purposes, the teachings of this patent document have general applicability and are not limited to the specific embodiments described above. For example, novel clamps 10 and 50 have multiple claws, however, in other embodiments, four-bar clamps are delivered with only one claw or with five or more claws. For additional information on the structure and operation of the novel clamping device in addition to how to construct at least one of the novel clamping devices, see: U.S. Provisional Patent Application Ser. No. 63/133,785, entitled "Three Claw Grabbing Tool For Hot Glass," filed on Jan. 4, 2021. Accordingly, various modifications, adaptations, and combinations of various features of the described embodiments can be practiced without departing from the scope of the invention as set forth in the claims.

What is claimed is:

1. An apparatus comprising:
an inner rod;
a sliding handle, wherein the sliding handle surrounds and slides about the inner rod;
a plurality of claws;
a top yoke, wherein the top yoke is coupled to the inner rod, and wherein each of the claws is coupled to the top yoke;
a bottom yoke, wherein the bottom yoke is coupled to the sliding handle, and wherein each of the claws is coupled to the bottom yoke via a linkage bar;
a spring, wherein the spring surrounds a portion of the inner rod; and
a counterweight, wherein the inner rod is coupled to the counterweight.

2. The apparatus of claim 1, wherein the inner rod is threadable into and out of the counterweight such that a distance between the counterweight and the sliding handle is configurable.

3. The apparatus of claim 1, wherein part of the spring is disposed within an interior of the sliding handle, wherein a first end of the spring contacts the counterweight, wherein a second end of the spring contacts the sliding handle, and wherein the spring applies force to the sliding handle.

4. The apparatus of claim 1, wherein each claw provides an equivalent clamping force independent of an orientation of the apparatus.

5. An apparatus comprising:
an inner rod;
a sliding handle, wherein the sliding handle surrounds and slides about the inner rod;
a plurality of claws;
a top yoke, wherein the top yoke is coupled to the inner rod, and wherein each of the claws is coupled to the top yoke; and
a bottom yoke, wherein the bottom yoke is coupled to the sliding handle, wherein each of the claws is coupled to the bottom yoke via a linkage bar, wherein the claws, the top yoke, the linkage bars, and the bottom yoke form four-bar linkages, and wherein claws clamp an object via a force transferred to the claws via the four-bar linkages.

6. The apparatus of claim 1, wherein each of the claws is rotatably coupled to the top yoke, and wherein each of the claws is rotatably coupled to the linkage bar.

7. The apparatus of claim 1, wherein the plurality of claws comprises:
- a first claw, wherein the first claw couples to the top yoke at a first yoke connection, and wherein the first claw couples to the bottom yoke via a first linkage bar;
- a second claw, wherein the second claw couples to the top yoke at a second yoke connection, and wherein the second claw couples to the bottom yoke via a second linkage bar; and
- a third claw, wherein the third claw couples to the top yoke at a third yoke connection, and wherein the third claw couples to the bottom yoke via a third linkage bar.

8. An apparatus comprising:
- an inner rod;
- a sliding handle, wherein the sliding handle surrounds and slides about the inner rod;
- a plurality of claws;
- a top yoke, wherein the top yoke is coupled to the inner rod, and wherein each of the claws is coupled to the top yoke; and
- a bottom yoke, wherein the bottom yoke is coupled to the sliding handle, wherein each of the claws is coupled to the bottom yoke via a linkage bar, wherein the plurality of claws comprises:
  - a first claw, wherein the first claw couples to the top yoke at a first yoke connection, and wherein the first claw couples to the bottom yoke via a first linkage bar;
  - a second claw, wherein the second claw couples to the top yoke at a second yoke connection, and wherein the second claw couples to the bottom yoke via a second linkage bar;
  - a third claw, wherein the third claw couples to the top yoke at a third yoke connection, and wherein the third claw couples to the bottom yoke via a third linkage bar; and
  - a fourth claw, wherein the fourth claw couples to the top yoke at a fourth yoke connection, and wherein the fourth claw couples to the bottom yoke via a fourth linkage bar.

9. The apparatus of claim 1, wherein the inner rod and top yoke are formed as a single unitary structure, or as two or more separate structures that are coupled together.

10. The apparatus of claim 1, wherein the sliding handle and bottom yoke are formed as a single unitary structure, or as two or more separate structures that are coupled together.

11. A method comprising:
- sliding an outer rod of a clamp in a first direction, wherein the clamp includes an inner rod, the outer rod, a plurality of claws, a top yoke, a bottom yoke, a spring, and a counterweight, wherein the outer rod surrounds and slides about the inner rod, wherein the top yoke is coupled to the inner rod, wherein each of the claws is coupled to the top yoke, wherein the bottom yoke is coupled to the outer rod, wherein each of the claws is coupled to the bottom yoke via a linkage bar, wherein the spring surrounds a portion of the inner rod, and wherein the inner rod is coupled to the counterweight;
- disposing an object within the claws; and
- sliding the outer rod in a second direction thereby clamping the object within the claws.

12. The method of claim 11, wherein sliding the outer rod in the first or second direction engages the spring disposed between the counterweight and the outer rod.

13. The method of claim 12, wherein the counterweight has threads that engage threads on an end of the inner rod, and wherein a distance between the claws is configurable based in part on how far the inner rod is threaded through the counterweight.

14. The method of claim 11, wherein the clamp includes at least two claws.

15. The method of claim 11, wherein the second direction is opposite the first direction.

16. An apparatus comprising:
- a clamp having an inner rod, a sliding handle, a plurality of claws, a top yoke, a bottom yoke, and a counterweight, wherein the sliding handle surrounds and slides about the inner rod, wherein the top yoke is coupled to the inner rod, wherein each of the claws is coupled to the top yoke, wherein the bottom yoke is coupled to the sliding handle, wherein each of the claws is coupled to the bottom yoke via a linkage bar, and wherein the inner rod is coupled to the counterweight; and
- means for generating a force transferrable to the claws via the linkage bars.

17. The apparatus of claim 16, wherein the means is a spring that surrounds a portion of the inner rod.

18. The apparatus of claim 16, wherein at least part of the inner rod is disposed within an interior of the sliding handle.

19. The apparatus of claim 16, wherein the sliding handle slides about the inner rod.

* * * * *